(12) United States Patent
Aritomi et al.

(10) Patent No.: US 8,467,078 B2
(45) Date of Patent: Jun. 18, 2013

(54) IMAGE FORMING APPARATUS, IMAGE PROCESSING METHOD, AND COMPUTER-READABLE STORAGE MEDIUM

(75) Inventors: Masanori Aritomi, Tokyo (JP); Akiko Tokumaru, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 984 days.

(21) Appl. No.: 12/534,039

(22) Filed: Jul. 31, 2009

(65) Prior Publication Data

US 2010/0027048 A1 Feb. 4, 2010

(30) Foreign Application Priority Data

Aug. 4, 2008 (JP) ................................. 2008-200946
Feb. 24, 2009 (JP) ................................. 2009-041002

(51) Int. Cl.
*G06K 15/02* (2006.01)

(52) U.S. Cl.
USPC ......... 358/1.14; 358/1.15; 358/468; 358/474; 382/100; 399/366

(58) Field of Classification Search
USPC ................ 358/1.14, 1.15, 468, 474; 382/100, 382/135; 399/8, 15, 80, 366
See application file for complete search history.

(56) References Cited

U.S. PATENT DOCUMENTS

| 5,390,003 A * | 2/1995 | Yamaguchi et al. ............ 399/15 |
| 7,023,573 B2 * | 4/2006 | Ohhashi et al. .............. 358/1.15 |
| 7,567,355 B2 | 7/2009 | Matsunoshita |
| 8,218,180 B2 * | 7/2012 | Shobu .......................... 358/1.14 |
| 2004/0184065 A1 * | 9/2004 | Guan et al. ................... 358/1.14 |
| 2006/0028693 A1 * | 2/2006 | Kagawa ........................ 358/1.14 |
| 2006/0197995 A1 * | 9/2006 | Tanaka .......................... 358/453 |
| 2006/0262341 A1 * | 11/2006 | Matsuda ...................... 358/1.14 |
| 2007/0195992 A1 * | 8/2007 | Ikenoue et al. ............... 382/100 |
| 2007/0279704 A1 | 12/2007 | Okamoto et al. |
| 2008/0100880 A1 * | 5/2008 | Matsunoshita ................ 358/471 |
| 2009/0304228 A1 * | 12/2009 | Ishikawa et al. .............. 382/100 |
| 2010/0046044 A1 * | 2/2010 | Ishizu et al. .................. 358/474 |

FOREIGN PATENT DOCUMENTS

| CN | 1445711 A | 10/2003 |
| CN | 101087344 A | 12/2007 |
| JP | 04-009963 A | 1/1992 |
| JP | 2000-270195 A | 9/2000 |
| JP | 2001-346032 A | 12/2001 |
| JP | 2003-280469 A | 10/2003 |
| JP | 2006-229670 A | 8/2006 |
| JP | 2006-253893 A | 9/2006 |
| JP | 2007-053443 A | 3/2007 |
| JP | 2007-201659 A | 8/2007 |
| JP | 2007-325233 A | 12/2007 |

* cited by examiner

*Primary Examiner* — Kimberly A Williams
(74) *Attorney, Agent, or Firm* — Canon U.S.A., Inc. IP Division

(57) ABSTRACT

An apparatus includes a reading unit configured to read a print product and a transmission unit configured to transmit image data of the print product to an external apparatus. The apparatus further includes an inhibition unit configured to inhibit the transmission of the image data based on inhibition information included in the image data. If the image data includes trace information to be used to trace a printer user of the print product in addition to the inhibition information, a control unit acquires the trace information and causes a display unit to perform a display based on the trace information without causing the output unit to transmit the image data.

15 Claims, 25 Drawing Sheets

IMAGE FORMING APPARATUS, IMAGE PROCESSING METHOD, AND COMPUTER-READABLE STORAGE MEDIUM

BACKGROUND OF THE INVENTION

1. Field of the Invention

The present invention relates to a reading apparatus, an information processing method, and a computer-readable storage medium.

2. Description of the Related Art

Recent widespread use of multifunction peripherals (MFPs) may increase the possibility of leakage of confidential information when the information is printed as a paper document. For example, to prevent confidential information from leaking, the following methods are usable.

As discussed in Japanese Patent Application Laid-Open No. 04-009963, there is a conventional method capable of preventing confidential information from leaking. To this end, the method includes a process of embedding inhibition information in a print product to prevent the print product from being copied by an unauthorized person. The inhibition information can be acquired as part of image data when a print product is scanned. The acquired inhibition information is used to inhibit a secondary output of the product (e.g., copy or transmission of a print product). The above-described function is referred to as an output inhibition function in the following description.

However, even in a case where a print product includes inhibition information for the purpose of inhibiting a secondary output (e.g., copy and transmission), the confidential information may leak directly if the print product is delivered by hand without being copied. In this case, embedding the inhibition information is meaningless. In such a case, tracing a printer user of a print product is performed.

As discussed in Japanese Patent Application Laid-Open No. 2001-346032, there is a conventional method for embedding, in addition to inhibition information, trace information in a print product. The trace information can be used to trace a printer user of a print product. If a print product includes trace information embedded therein, the trace information enables to trace print related information such as print date/time, printer place, and printer user.

Further, when a print product includes printer user information embedded therein, the information can prevent confidential information from being leaked even when the print product is carelessly handled. The function described above is referred to as information analysis function in the following description.

As described below, in APEOSPORT II and TrustMarking-Basic, trace information is acquired from a print product if both inhibition information and trace information are embedded in this print product.

An MFP scans a print product and generates image data. The MFP transmits the generated image data to an external apparatus (such as a personal computer (PC) or a server) on which an analysis application is installed to acquire trace information. The analysis application operable on the external apparatus acquires the trace information from the received image data and displays the acquired trace information.

However, image data may include secret information. Therefore, a method, which can analyze trace information using more secure and simpler method without transmitting image data to an external apparatus for the purpose of acquiring and displaying trace information, is processed.

SUMMARY OF THE INVENTION

The present invention is directed to a reading apparatus and an information processing method that can acquire trace information from an image data and display the trace information using more secure and simpler method.

According to an aspect of the present invention, an apparatus comprising a reading unit configured to read a print product, a transmission unit configured to transmit image data of the print product to an external apparatus, an inhibition unit configured to inhibit transmission of the image data to be performed by the transmission unit based on inhibition information included in the image data, and an acquisition and display unit configured to acquire the trace information and perform a display based on the trace information without causing the transmission unit to transmit the image data, if the image data includes trace information in addition to the inhibition information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
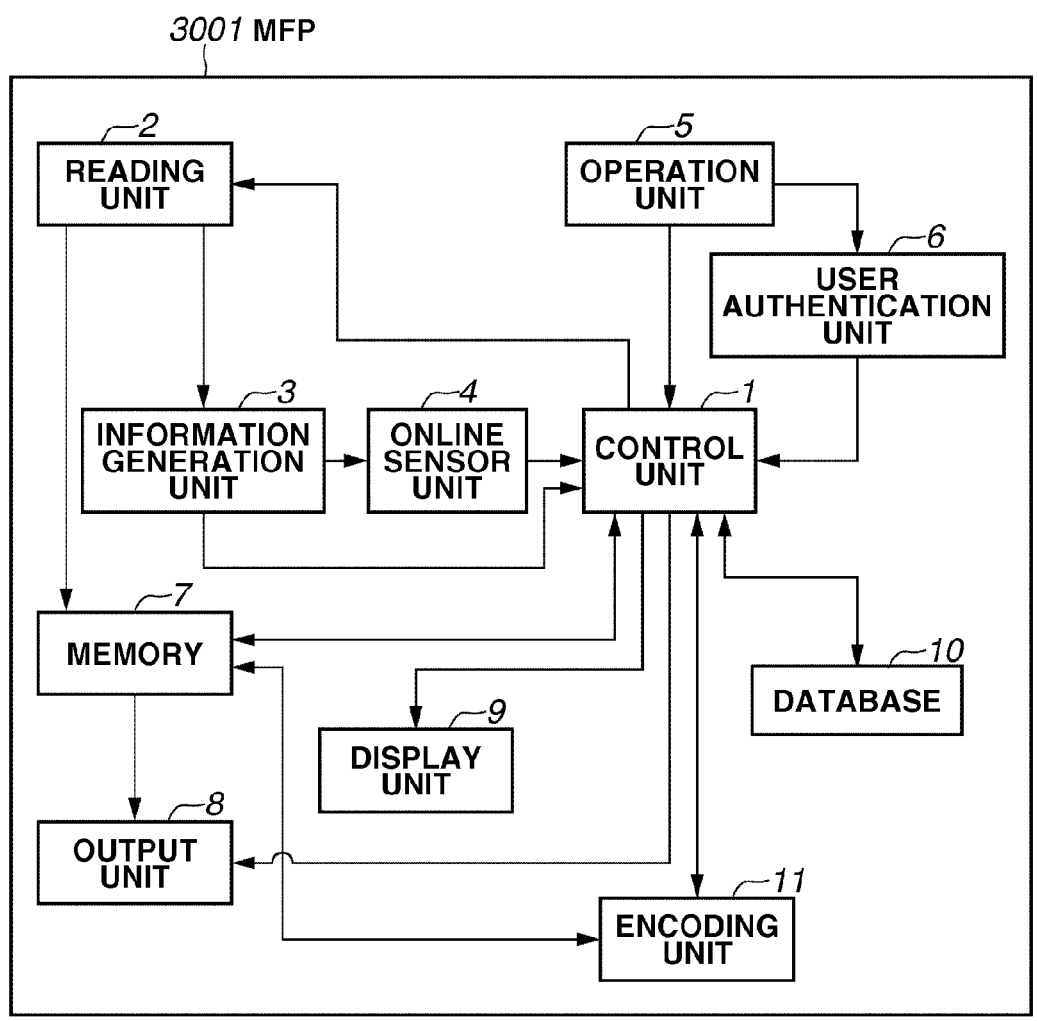
FIG. 1 is a block diagram illustrating an MFP according to a first exemplary embodiment.

FIG. 1 is a block diagram illustrating a configuration of an MFP 3001 that can serve as a reading apparatus according to an exemplary embodiment. The reading apparatus according to the present exemplary embodiment is not limited to a reading unit of the MFP 3001 and includes other functions (e.g., a printer engine) of the apparatus.

A control unit 1 can perform control for various units included in the MFP 3001. An operation unit 5 can receive operational instructions entered from users. A user authentication unit 6 can manage authentication of each user who uses the MFP 3001. A reading unit 2 can perform scanning processing for reading a print product and can generate image data.

An information generation unit 3 can obtain embedded information from an information pattern included in the image data. An online sensor unit 4 can decode the embedded information to acquire inhibition information that is online data. A memory 7 (i.e., computer-readable storage medium) stores image data obtained through the scanning processing by the reading unit 2.

An output unit 8 can read the image data from the memory 7 and can perform output processing including printing of the image data and transmission of the image data to an external apparatus. The external apparatus is, for example, a personal computer (PC) connected via a network to the MFP 3001.

A display unit 9 can display various information, images, and data to be presented to users under the control of the control unit 1. A database unit 10 can store settings and logs for the MFP 3001. An encoding unit 11 can encode inhibition information and trace information to generate embedded information, and can generate an information pattern that includes an image of the embedded information.

Figure 2:
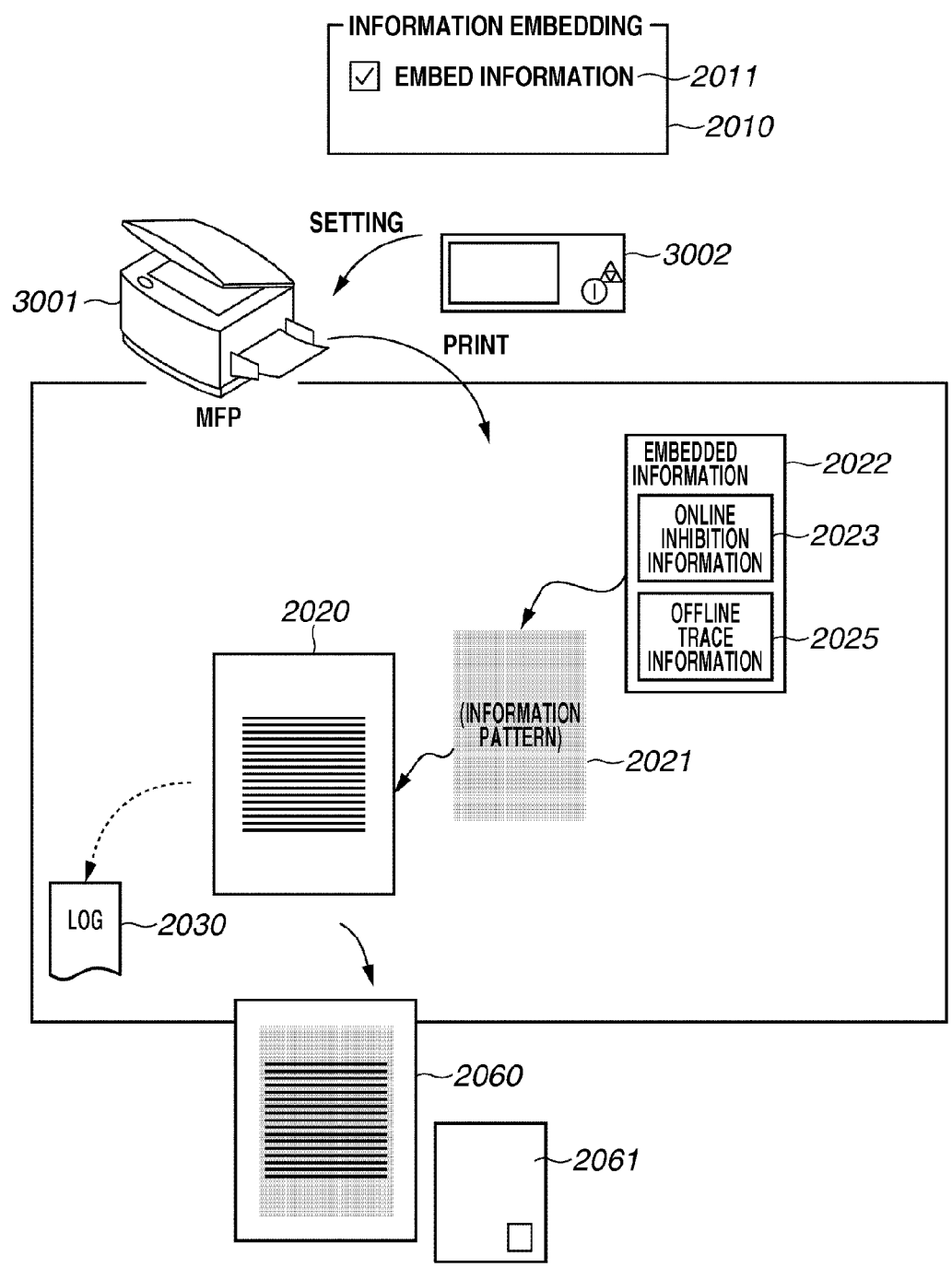
FIG. 2 illustrates a printing operation that is performed by the MFP according to the first exemplary embodiment.

An example printing operation that can be performed by the MFP 3001 according to the present exemplary embodiment is described below with reference to FIG. 2.

A setting screen 3002, which can serve as the display unit 9 of the MFP 3001, enables users to instruct an information embedding operation via the operation unit 5. The control unit 1 sets the information embedding operation based on an entered user's instruction.

For example, if a check mark is input in an "embed information" checkbox 2011 of an "information embedding" group box 2010, the MFP 3001 embeds inhibition information and trace information as an information pattern that can be printed as part of a print product. A driver or a utility installed on a PC connected to the MFP 3001 may allow users to perform information embedding setting.

If the operation unit 5 receives a print instruction from a user, the control unit 1 causes the output unit 8 to print image data 2020 stored in the memory 7. The following is an operation that can be performed by the MFP 3001 in response to a print instruction from a user who has input a check mark in the check box 2011.

An information pattern 2021 is a pattern representing embedded information 2022, which can be formed as an image by the encoding unit 11. The embedded information 2022 includes inhibition information 2023 and trace information 2025 as 2-channel encoded data. The inhibition information 2023 is online data. The trace information 2025 is offline data.

A channel for the inhibition information 2023 (i.e., online data) corresponds to an LDD channel that is described below. The inhibition information 2023 is to be speedily detected because the inhibition information 2023 is used to inhibit an output of image data obtained by scanning in response to a detection of the inhibition information 2023 in a scanning operation described below.

The trace information 2025 (i.e., offline data) includes information that can be used to trace a printer user of a print product 2060. For example, the trace information 2025 includes print operation information, such as print date/time, printer user name, and device name. A channel for the trace information 2025 corresponds to an HDD channel that is described below.

The above-described printing operation can be recorded as a log 2030 in the MFP 3001. Then, the MFP 3001 prints the print product 2060 that includes the information pattern 2021 superposed on the image data 2020. The document 2060 illustrated in FIG. 2 includes the information pattern 2021 having a full-scale size comparable to the size of the print product 2060. However, the information pattern 2021 can be another pattern having a smaller size (see a document 2061 illustrated in FIG. 2).

Figure 4:
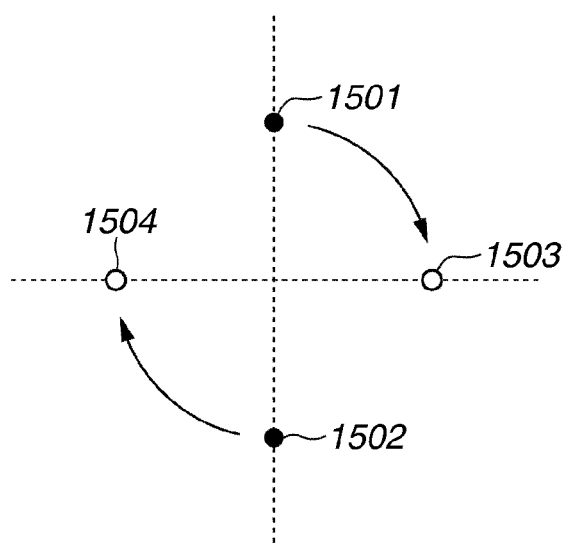
FIG. 4 illustrates an angular rotation of the dots.
Figure 5:
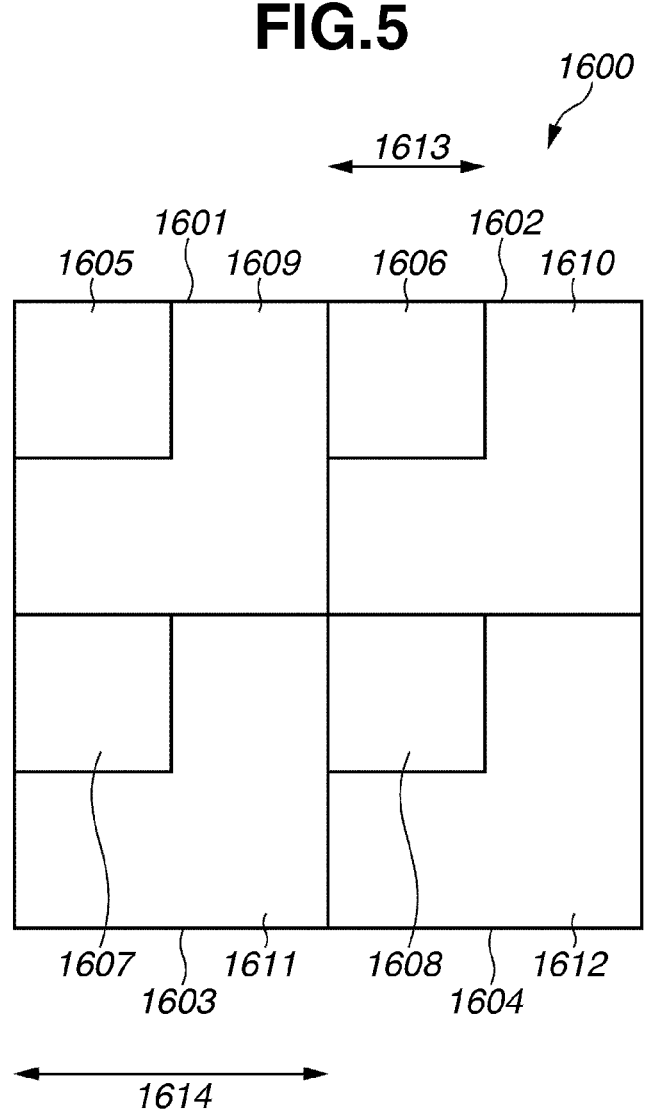
FIG. 5 illustrates an example layout of information embedding areas.

An example method for embedding the inhibition information 2023 and the trace information 2025 into the print product 2060 in a printing operation is described below with reference to FIGS. 3, 4, and 5. The method for embedding the inhibition information 2023 and the trace information 2025 into the print product 2060 is not limited to the following method.

Figure 3:
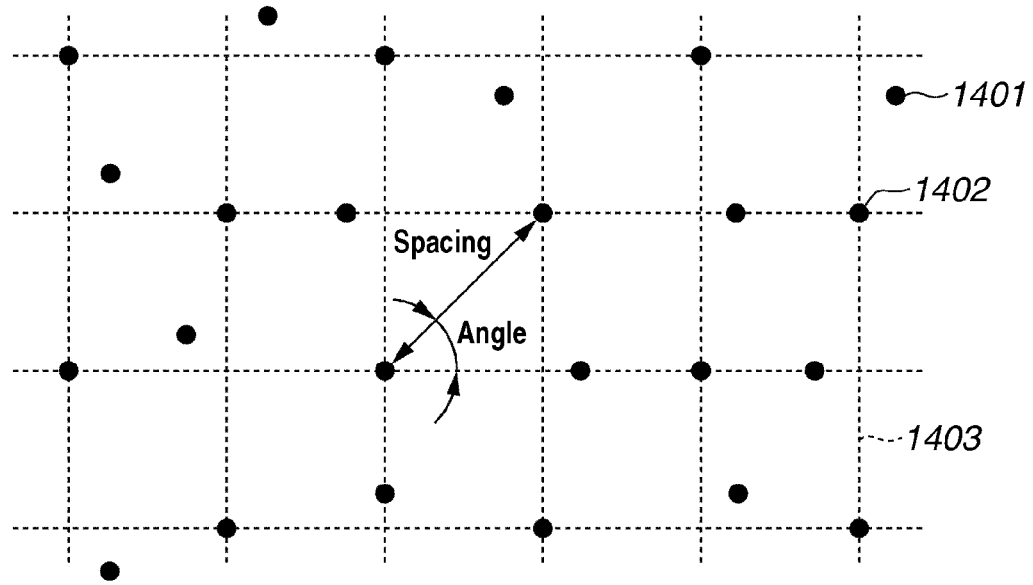
FIG. 3 illustrates a grid and dots that can be used to embed information.

FIG. 3 illustrates an example layout of data dots 1401 and array dots 1402.

A reference grid 1403 is a grid defined by a plurality of array dots 1402. The position of each data dot 1401 is adjustable in relation to the reference grid 1403. As illustrated in FIG. 4, dots 1501 and 1502 are rotatable by an angle of 90 degrees to calculate coordinate values 1503 and 1504. Performing 90-degree rotation in this manner enables to determine whether the dots 1501 and 1502 are the array dots 1402.

In the present exemplary embodiment, the information pattern 2021 (i.e., a single pattern) can store 2-channel data.

The embedded information 2022 is a pattern repetitively tiled in the entire area of the grid. FIG. 5 illustrates a single unique tile 1600 and its tiling layout. The tile 1600 includes two types of channels, i.e., a high-density data channel (i.e., HDD channel) and a low-density data channel (i.e., LDD channel).

The HDD channel has lower robustness, while the LDD channel has higher robustness. The tile 1600 includes four sub-tiles 1601, 1602, 1603, and 1604 each serving as an HDD channel tile.

Each HDD channel tile is a square grid having a size 1614 in units of grid cell or data dot (which can be referred to as an "HDD tile size"). Each HDD channel tile includes a piece of embedding tile that can be referred to as an "LDD channel tile."

The tile 1600 includes four LDD channel tiles 1605, 1606, 1607, and 1608. In other words, the tile 1600 includes four copies of the same LDD channel tile.

Each LDD channel tile is a square grid having a size 1613 in units of grid cell or data dot (which can be referred to as "LDD tile size"). In addition, the HDD channel occupies a complete area of four HDD channel tiles that respectively exclude the LDD channel tiles. It means that the tile 1600 includes a single copy of the HDD channel. For example, areas 1609, 1610, 1611, and 1612 can collectively constitute the HDD channel.

The number of HDD channel tiles for storing HDD tiles can be increased as necessary.

An error correction code (ECC) can be applied to both data of the LDD and HDD channels. The ECC usable in the present exemplary embodiment is, for example, a low-density parity check (LDPC) code, which is conventionally known as a high-performance ECC.

If image data is scanned, the tile 1600 is converted into binary information of 0 and 1 (i.e., embedded information 2022). The binary information can be further changed into meaningful information (i.e., inhibition information 2023 and trace information 2025) through the error correction and decoding processing.

The information generation unit 3 can perform the above-described information generation processing. The online sensor unit 4 and the control unit 1 can perform combining processing. In this manner, the inhibition information 2023 and the trace information 2025 can be acquired from the information pattern 2021 (the tile 1600).

In the present exemplary embodiment, the LDD channel includes the inhibition information 2023 and the HDD channel includes the trace information 2025. Compared to the LDD channel, the HDD channel can include a larger amount of information. Therefore, a relatively long time may be used to perform error correction and decoding processing for the data of the HDD channel. In other words, acquisition of the trace information 2025 takes a longer time than acquisition of the inhibition information 2023.

Hence, in a normal mode described below, in a case where an output of image data is inhibited based on inhibition information, the trace information 2025 is not acquired if it is unnecessary.

Figure 6:
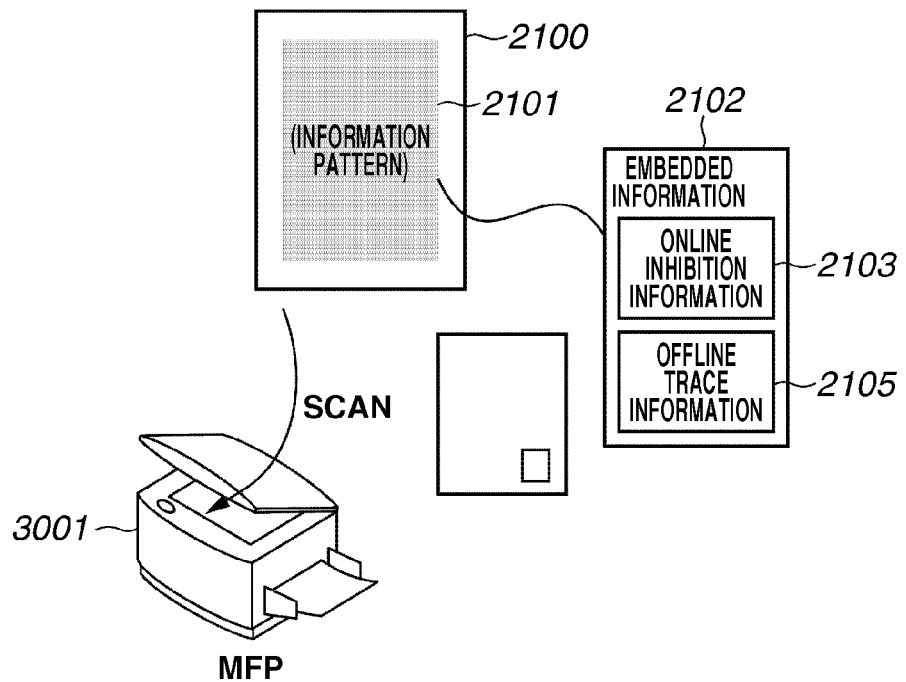
FIG. 6 illustrates a scanning operation that can be performed by the MFP according to the first exemplary embodiment.

Example operation mode setting that can be performed by the MFP 3001 is described below with reference to FIG. 6. The MFP 3001 has three types of operation modes, i.e., a normal mode, an information analysis mode, and a suspended state determination mode. The control unit 1 can perform mode setting based on a selection instruction received from a user via the operation unit 5.

A mode that a user can select and instruct (i.e., a settable mode) can be changed according to a user's authority, which can be determined by the user authentication unit 6, in the following manner. This can be referred to as "settable mode change." If it is determined that the user's authority is an administrative right, all of the normal mode, the information analysis mode, and the suspended state determination mode are set as settable modes.

If it is determined that the user's authority is not an administrative right, both of the normal mode and the suspended state determination mode are set as settable modes and the information analysis mode is not set as a settable mode.

When the settable mode is changed according to a user's authority as described above, only a user who has an administrative right can view details of the trace information that can be used to trace a printer user of a print product. Thus, the present exemplary embodiment can protect the privacy of a printer user for users other than the administrator of the printer user.

Next, example operations of the MFP 3001 in the normal mode and the information analysis mode are described below. An operation of the MFP 3001 in the suspended state determination mode is described in the second exemplary embodiment. In the following description of each operation mode, the reading unit 2 performs scanning on a print product 2100 based on an instruction from a user.

The print product 2100, i.e., an object to be scanned by the reading unit 2, includes an information pattern 2101 as an image representing embedded information 2102 that includes a 2-channel data of the inhibition information 2103 (i.e., online data) and the trace information 2105 (i.e., offline data).

First, the normal mode is described below with reference to FIG. 7. The normal mode can be selected when a user instructs copying or transmitting image data obtained by scanning.

Figure 7:
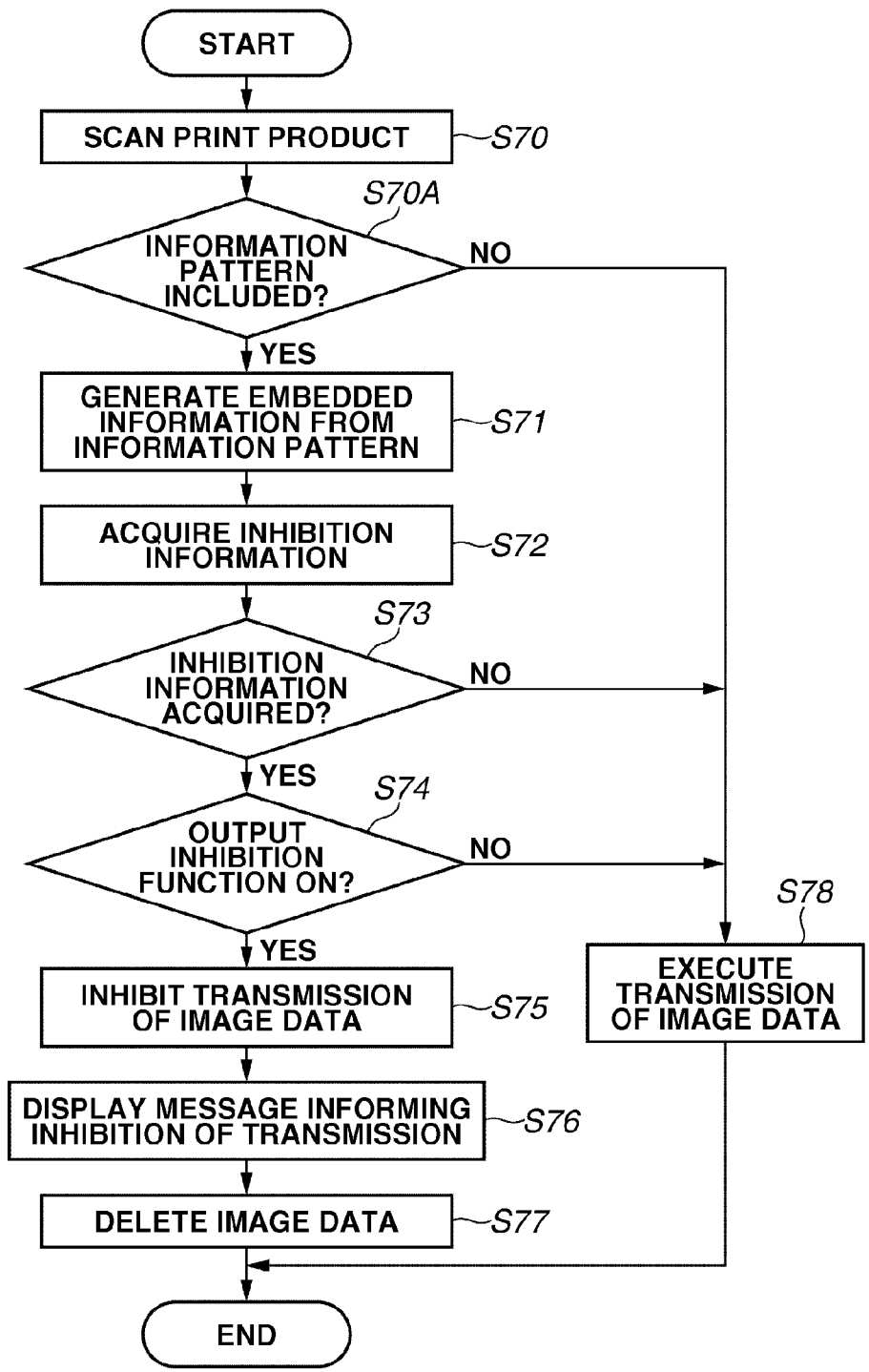
FIG. 7 is a flowchart illustrating example processing in a normal mode, which is performed by the MFP.

FIG. 7 is a flowchart illustrating an example operation that is performed by the MFP 3001 to transmit image data obtained by scanning in the normal mode. The MFP 3001 starts the processing of the flowchart illustrated in FIG. 7 when a user instructs, via the operation unit 5, to transmit image data of a print product to an external apparatus.

In step S70, the reading unit 2 scans the print product 2100 and generates image data.

In step S70A, the information generation unit 3 determines whether the generated image data includes the information pattern 2101. If it is determined that the generated image data includes the information pattern 2101 (YES in step S70A), the processing proceeds to step S71. If it is determined that the generated image data does not include the information pattern 2101 (NO in step S70A), the processing proceeds to step S78.

In step S71, the information generation unit 3 generates the embedded information 2102 based on the information pattern 2101 included in the generated image data.

In step S72, the online sensor unit 4 acquires the inhibition information 2103 (i.e., online data) that can be decoded from the generated embedded information 2102.

In step S73, the control unit 1 determines whether the inhibition information 2103 is acquired. If it is determined that the inhibition information 2103 is acquired (YES in step S73), the processing proceeds to step S74. If it is determined that the inhibition information 2103 is not acquired (NO in step S73), the processing proceeds to step S78.

In step S74, the control unit 1 determines whether the setting of the output inhibition function is ON. If it is determined that the setting of the output inhibition function is ON (YES in step S74), the processing proceeds to step S75. If it is determined that the setting of the output inhibition function is OFF (NO in step S74), the processing proceeds to step S78.

In the present exemplary embodiment, a user inputs ON/OFF of the output inhibition function via the operation unit 5 and the control unit 1 performs setting based on the user's input. In this case, only a user who has an administrative right is allowed to perform the above-described setting.

In step S75, the control unit 1 controls the output unit 8 based on the inhibition information 2103 so that the image data is inhibited from being transmitted to an external apparatus. In step S76, the control unit 1 controls the display unit 9 to display a message informing the user of inhibited transmission of the image data.

In step S77, the control unit 1 deletes the image data whose transmission is inhibited from the memory 7. Then, the control unit 1 terminates the processing illustrated in FIG. 7. In step S78, the control unit 1 controls the memory 7 and the output unit 8 to perform transmission of the image data. Then, the control unit 1 terminates the processing illustrated in FIG. 7.

If the transmission of the scanned image data is changed to copy of the scanned image data in the above-described description, the control unit 1 can perform similar processing by replacing the above-described "transmission" with "copy."

The information analysis mode is described below with reference to FIG. 8. The information analysis mode can be selected when a user instructs a display based on the trace information 2105. In the information analysis mode, the control unit 1 acquires the trace information 2105 included in a print product and the display unit 9 displays the trace information 2105.

Figure 8:
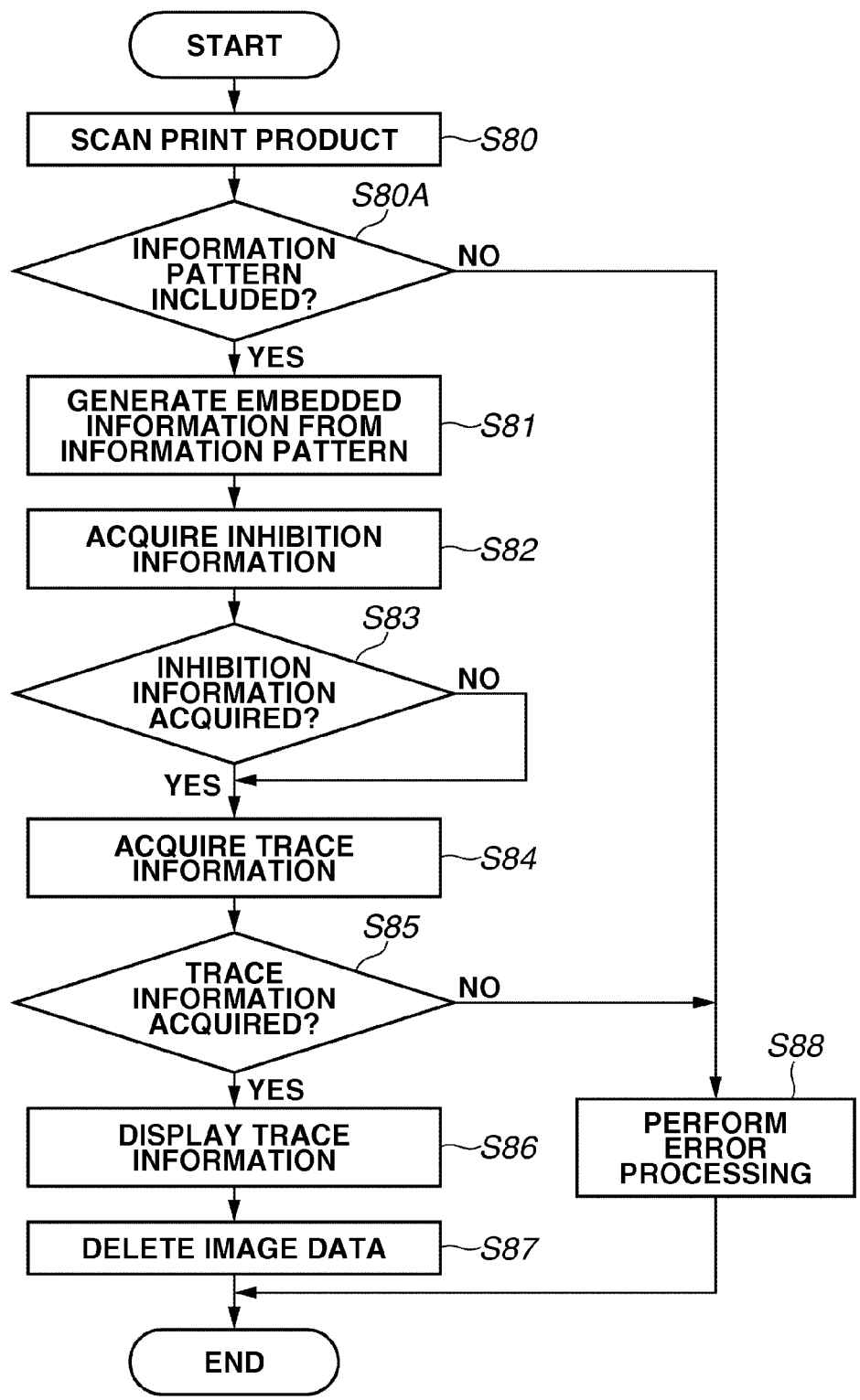
FIG. 8 is a flowchart illustrating example processing in an information analysis mode, which is performed by the MFP.

FIG. 8 is a flowchart illustrating an example operation that is performed by the MFP 3001 in the information analysis mode. The MFP 3001 starts the processing of the flowchart illustrated in FIG. 8 when a user instructs a display of the trace information 2105 via the operation unit 5. In step S80, the reading unit 2 scans the print product 2100 and generates image data.

In step S80A, the information generation unit 3 determines whether the generated image data includes the information pattern 2101. If it is determined that the generated image data includes the information pattern 2101 (YES in step S80A), the processing proceeds to step S81. If it is determined that the generated image data does not include the information pattern 2101 (NO in step S80A), the processing proceeds to step S88.

In step S81, the information generation unit 3 generates the embedded information 2102 from the information pattern 2101 included in the generated image data. In step S82, the online sensor unit 4 acquires the inhibition information 2103 (i.e., online data) by decoding the generated embedded information 2102.

In step S83, the control unit 1 determines whether the inhibition information 2103 is acquired. If it is determined that the inhibition information 2103 is acquired (YES in step S83), or if it is determined that the inhibition information 2103 is not acquired (NO in step S83), the processing proceeds to step S84.

In step S84, the control unit 1 acquires the trace information 2105 (i.e., offline data) from the generated embedded information 2102. In this case, the MFP 3001 itself acquires the trace information 2105 without transmitting the image data to an external apparatus.

As described above, when the MFP 3001 itself acquires the trace information 2105 and does not transmit the image data to an external apparatus, the image data can be prevented from leaking via a network or from leaking from an external apparatus if the image data is once received by the external apparatus. Moreover, as it is unnecessary to transmit the image data to an external apparatus, the trace information 2105 can be acquired without changing the settings even when the output inhibition function of the MFP 3001 is ON.

Therefore, the output inhibition function can be kept in an OFF state. The print product 2100 including the inhibition information 2103 embedded therein can be prevented from being copied or transmitted.

In step S85, the control unit 1 determines whether the trace information 2105 is acquired. If it is determined that the trace information 2105 is acquired (YES in step S85), the processing proceeds to step S86. If it is determined that the trace information 2105 is not acquired (NO in step S85), the processing proceeds to step S88.

In step S86, the control unit 1 controls the display unit 9 to display the acquired trace information 2105. In this case, the display unit 9 can perform a display operation based on the inhibition information 2103 in addition to the trace information 2105.

The inhibition information 2103 can be used as an index in determining whether the content printed on the print product 2100 is important. Therefore, performing the display based on the inhibition information 2103 in addition to the trace information 2105 enables the user to recognize the importance of the print product 2100.

In step S87, the control unit 1 deletes the image data from the memory 7 in response to the acquisition of the trace information 2105. Then, the control unit 1 terminates the processing according to the information analysis mode. In this case, as an operation different from that in the normal mode, the control unit 1 does not delete image data based on the inhibition information 2103. The control unit 1 postpones deleting the image data until the trace information 2105 is acquired even in a state where the inhibition information 2103 is already acquired.

Then, in response to the acquisition of the trace information 2105, the control unit 1 deletes the image data. Deleting the image data in this manner can prevent the image data from leaking even when a user instructs outputting the image data, or even when the memory 7 is removed.

Therefore, the MFP 3001 can prevent important image data containing the embedded inhibition information 2103 from leaking and can execute the information analysis function in a higher security environment.

In the present exemplary embodiment, the deletion of the image data is a logical deletion, according to which a link of the image data in the memory 7 is removed to open the area so as to be overwritten. However, the deletion of the image data can be a physical deletion in which the image data of the memory 7 is overwritten by "0" and completely deleted.

The image data containing the inhibition information 2103 is generally regarded as important data. Physically deleting the image data can enhance the security. Further, instead of deleting the image data, the control unit 1 can perform processing for preventing the image data from being used by users.

In a case where the usage of image data is disabled as described above, it may be useful to prevent specific users from using the image data. For example, any user who has no administrative right is rejected to use the image data and any user who has an administrative right is allowed to use the image data.

As described above, the present exemplary embodiment can prevent a user having no administrative right from using image data and, as a result, can enhance the usability of a user having an administrative right.

Further, if deletion of the image data is postponed until the trace information 2105 is acquired, the following effect can be obtained. More specifically, the present exemplary embodiment can avoid a situation that the trace information 2105 cannot be acquired if the image data is erroneously deleted based on the inhibition information 2103 before the trace information 2105 is acquired.

The control unit 1 uses a first deletion method in the information analysis mode. In the first deletion method, the image data is deleted based on the inhibition information 2103. The control unit 1 uses a second deletion method in the normal mode. In the second deletion method, the image data is deleted in response to an acquisition of the trace information 2105. Thus, in the normal mode, the control unit 1 can delete the important image data containing the inhibition information. Further, in the information analysis mode, the control unit 1 can delete the image data while surely acquiring the trace information.

In step S88, the control unit 1 controls the display unit 9 to display a message indicating that the acquisition of the trace information 2105 is failed and the display of the trace information cannot be performed. Then, the control unit 1 terminates the processing according to the information analysis mode.

If there are a plurality of print products (i.e., processing targets), the control unit 1 performs the following operations in the normal mode and in the information analysis mode.

It is now assumed that, in the normal mode, a user instructs transmitting image data of a print product including a plurality of sheets. In this case, if the online sensor unit 4 determines that image data of the Nth sheet of the print product contains the inhibition information 2103, the control unit 1 inhibits the Nth sheet of the print product from being transmitted.

In this case, the user sets a plurality of sheets as a single print product and instructs transmitting image data of the print product for the purpose of transmitting the entire contents of the set print product. In such a case, if transmission of a specific sheet of the print product is inhibited based on the inhibition information 2103, the user will not be satisfied with the result even if image data of other sheets can be received.

Accordingly, transmitting a print product that includes image data of all sheets but a specific sheet is meaningless. Scanning the sheets of the print product and generating image data is useless. From the foregoing reasons, the control unit 1 controls the reading unit 2 to cancel scanning the following (i.e., (N+1)th and subsequent) sheets of the print product. This processing can be executed between step S75 and step S76 in the flowchart illustrated in FIG. 7.

The control unit 1 can perform processing for transmitting the image data of all sheets of the print product but the Nth sheet in the following manner. First, no image data of the (N+1)th and subsequent sheets of the print product can be generated because these sheets are not scanned. Therefore, no image data can be transmitted.

However, in a case where the reading speed is fast and the image data of the (N+1)th and subsequent sheets of the print product has been already generated before interruption, the control unit 1 stops outputting the generated image data. On the other hand, image data of the (N−1)th and preceding sheets of the print product are present because scanning of these sheets is already finished.

If the MFP 3001 causes the output unit 8 to transmit image data immediately after the image data is generated, the MFP 3001 inhibits transmission of image data that is not yet transmitted from the memory 7. In this case, some of the image data may be transmitted to an external apparatus if the interruption timing is too late.

If the MFP 3001 causes the output unit 8 to simultaneously transmit all of a plurality of image data, the MFP 3001 inhibits transmission of all image data generated from a plurality of print products. The MFP 3001 can perform similar processing even when the output is a copy of image data (not a transmission of image date).

It is now assumed that, in the information analysis mode, a user instructs performing a display based on trace information contained in a print product that includes a plurality of sheets. The information analysis mode is a mode to be selected by the MFP 3001 to acquire the trace information 2105 irrespective of the presence of the inhibition information 2103 and display the acquired trace information 2105.

To this end, even when the inhibition information 2103 is embedded in the image data of the Nth sheet of the print product, the control unit 1 controls the reading unit 2 to continuously scan the remaining sheets of the print product if the information analysis mode is selected.

As described above, in a case where the inhibition information 2103 is included in a print product, the following effects can be obtained by selectively performing the scanning processing on the subsequent sheets of the print product depending on the operation mode (e.g., the normal mode or the information analysis mode).

More specifically, in the information analysis mode, the MFP 3001 can acquire the trace information 2105 from a print product, which includes a plurality of sheets and contains the inhibition information 2103, and can display the acquired trace information 2105.

A second exemplary embodiment of the present invention is described below with reference to attached drawings. A system according to the exemplary embodiment includes an MFP and a PC. However, the present invention is not limited to the illustrated configuration.

An example printing operation that is performed by the MFP 3001 according to the present exemplary embodiment is described below with reference to FIG. 9.

The MFP 3001 (apparatus) displays the setting screen 3002 to enable users to perform setting of an information embedding operation. If a check mark (i.e., ON) is input in the "embed information" check box 2011 of the "information embedding" group box 2010, the MFP 3001 embeds information in the original that is printed on a print product. A "scan lock" check box 2012 enables users to switch an ON/OFF state of the scan lock. A driver or a utility installed on a PC 1001 connected to the MFP 3001 may allow users to perform information embedding setting.

The PC 1001 transmits a job 2002 to the MFP 3001. The MFP 3001 performs a copy 2003. Based on the job 2002 and the copy 2003 received from the PC 1001 and the MFP 3001, the MFP 3001 performs a print 2004 as a composite image of the original 2020 and the information pattern 2021 superposes thereon.

The information pattern 2021 is an encoded pattern of the embedded information 2022. The embedded information 2022 includes the inhibition information 2023 (i.e., online data) and the trace information 2025 (i.e., offline data) as 2-channel data. The inhibition information 2023 (i.e., online data) includes a scan lock setting 2024. A channel for the inhibition information 2023 corresponds to the above-described LDD channel.

The scan lock setting 2024 is to be speedily detected to stop the scanning operation in response to a detection in the scanning operation. The trace information 2025 (i.e., offline data) includes print operation information 2026.

The print operation information 2026 includes print attribute information (e.g., date/time, user name, and device name). A channel for the print operation information 2026 corresponds to the above-described HDD channel. A relatively long time can be used to detect the print operation information 2026, compared to the time for the above-described scan lock 2024.

The above-described operation for the print 2004 can be recorded as the log 2030 in the MFP 3001. Then, the document 2060 including the embedded information is printed.

Figure 9:
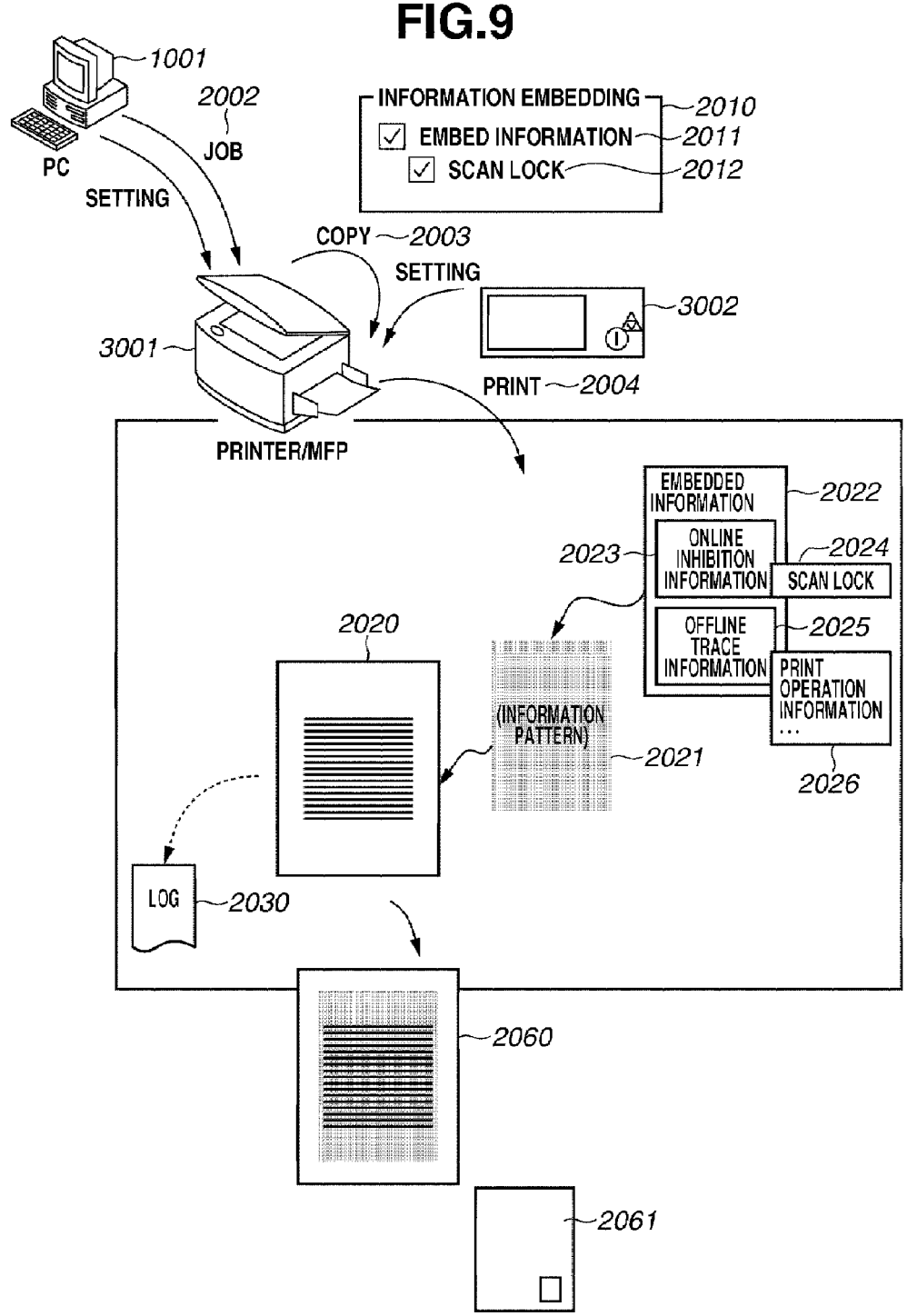
FIG. 9 illustrates a printing operation that can be performed by the apparatus.

The document 2060 illustrated in FIG. 9 includes a full-size information pattern. However, the information pattern can be a reduced pattern (e.g., a bar code pattern) having a smaller size as illustrated on the document 2061.

Figure 10:
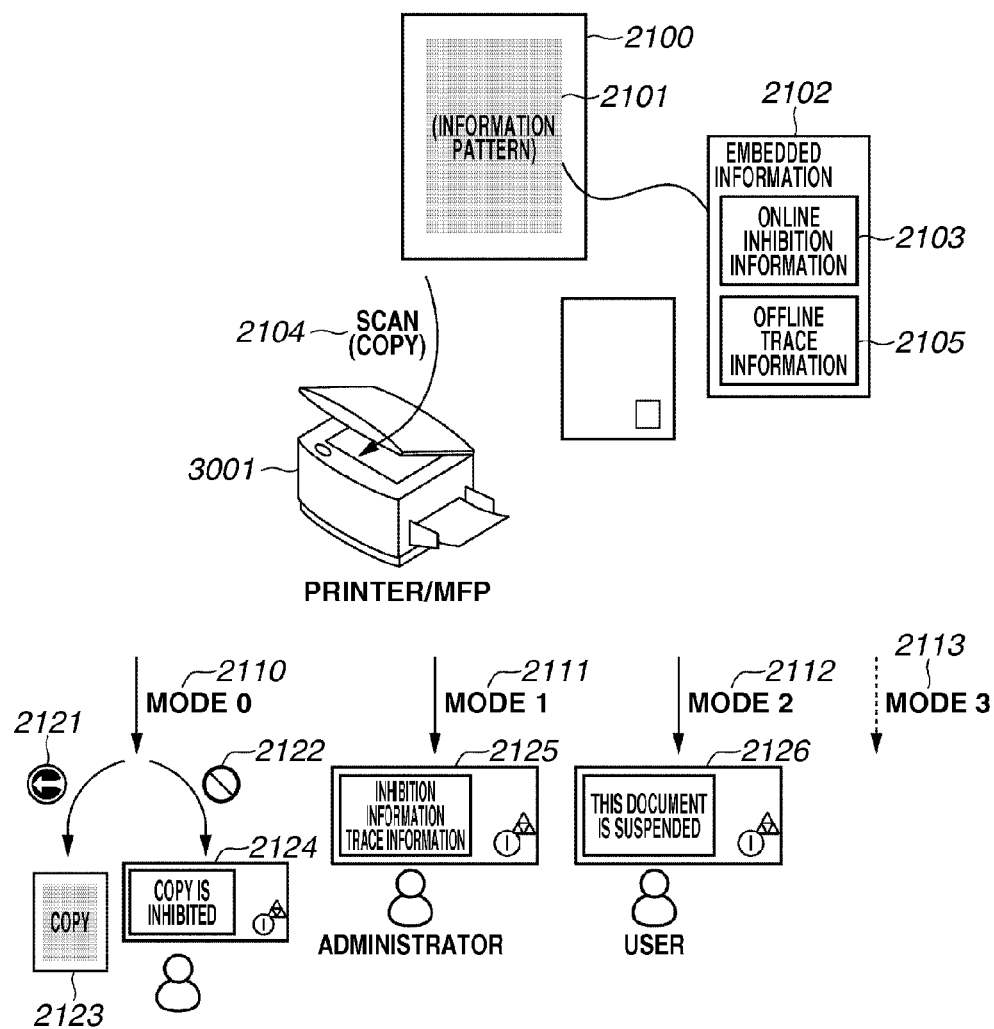
FIG. 10 illustrates a scanning operation that is performed by the apparatus.

Example scanning operation of the apparatus is described below with reference to FIG. 10. The information pattern 2101 is an encoded pattern of the embedded information 2102 that includes the inhibition information 2103 (i.e., online data) and the trace information 2105 (i.e., offline data) as 2-channel data.

The document 2100 includes the combined information pattern 2101. The MFP 3001 scans (or copies) (see 2104) the document 2100. The scanning (copy) operation 2104 can be performed according to any one of a plurality of modes 2110 to 2113.

The first mode is a normal mode 0 (see 2110). In the mode 0, if the ON state of the inhibition information 2103 is detected, the MFP 3001 inhibits scanning (see 2122). The MFP 3001 causes its display unit to display a message (see 2124) that informs an inhibited state 2122. In the mode 0, if the OFF state of the inhibition information 2103 is not detected, the MFP 3001 performs the scanning processing (see 2121) and prints a copy 2123 of the document 2100.

The second mode is a mode 1 (see 2111). In the mode 1, the MFP 3001 causes its display unit to display the detected trace information 2105 (see 2125).

The third mode is a mode 2 (see 2112). In the mode 2, the MFP 3001 determines whether a suspended document in its discharge portion is a print suspended original if it is scanned. The MFP 3001 causes its display unit to display a determination result (see 2126). The display unit displays the determination result without directly displaying the detected embedded information.

If it is desired to further add an operation of the scanning (copy) operation 2104, an additional mode 3 (see 2113) can be provided.

Figure 11:
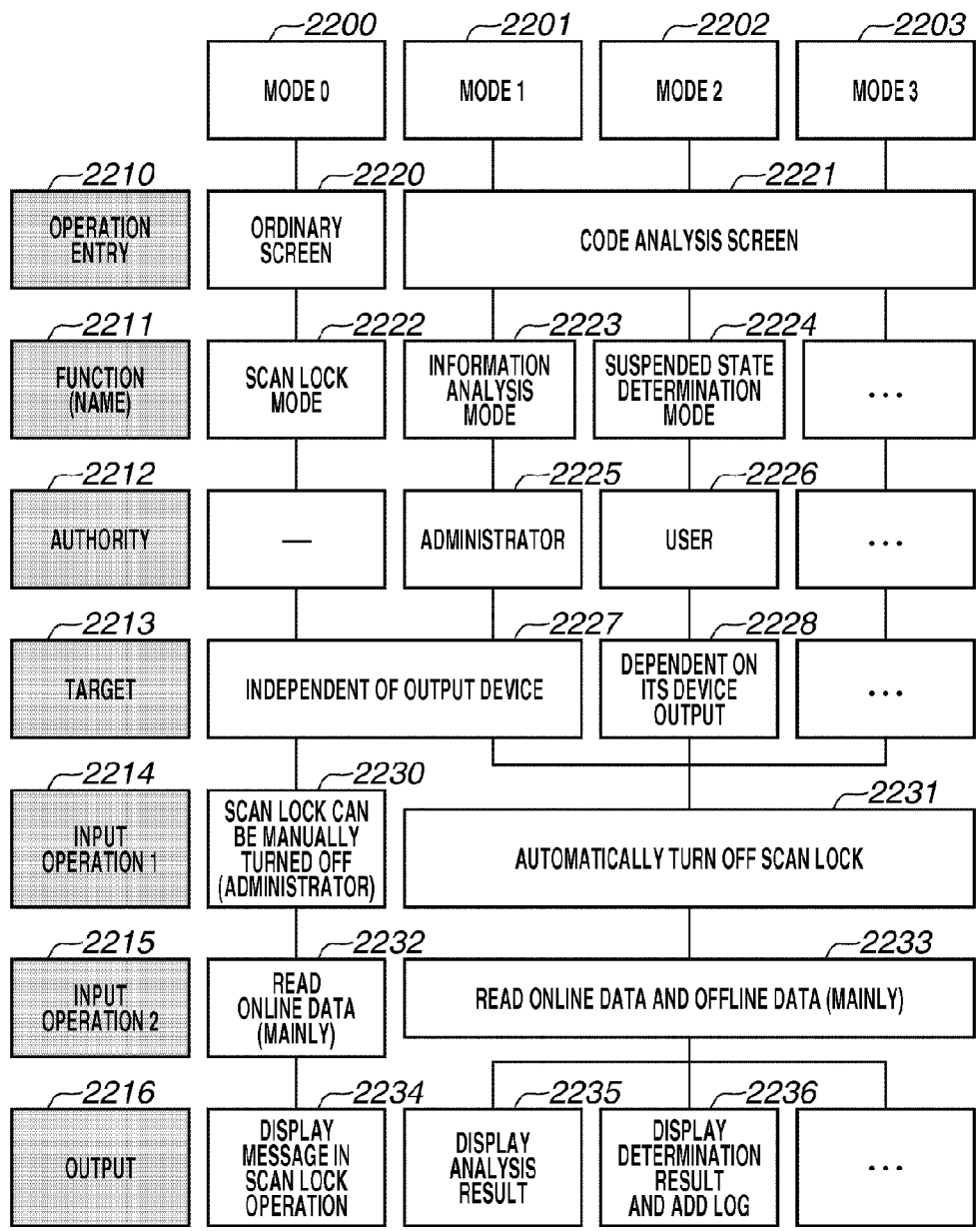
FIG. 11 illustrates an apparatus configuration in respective operation modes.

Example configurations in respective modes of the scanning operation that is performed by the apparatus are described below with reference to FIG. 11. In FIG. 10, the scanning operation and its modes are schematically described. FIG. 11 illustrates example configurations in respective modes with respect to operation entry, function name, authority, target original, and input/output operations.

There are three modes of mode 0 (see 2200), mode 1 (see 2201), and mode 2 (see 2202). Mode 3 (see 2203) is an additional mode and its configuration is omitted.

An operation entry 2210 is an entrance configuration of the operation unit corresponding to each mode. The operation entry 2210 is a normal screen 2220 if mode 0 is selected and a code analysis screen 2221 if mode 1 or mode 2 is selected. A function (name) 2211 is a scan lock mode 2222 if mode 0 is selected, an information analysis mode 2223 if mode 1 is selected, and a suspended state determination mode 2224 if mode 2 is selected.

The scan lock mode 2222 in the mode 0 (see 2200) is operable when a user uses the normal copy and scanning screen 2220. The information analysis mode 2223 in the mode 1 (see 2201) and the suspended state determination mode 2224 in the mode 2 (see 2202) are operable when the user uses the code analysis screen 2221.

An authority 2212 is an authority configuration in each mode. An administrator's authority 2225 is used in the mode 1 (see 2201). A user's authority 2226 is used in the mode 2 (see 2202).

A target 2213 is a configuration of a processing target print product (i.e., an original to be processed by the apparatus). If the operation mode is mode 0 (see 2200) or mode 1 (see 2201), each original is regarded as a processing target print product irrespective of its output device (see 2227). If the operation mode is mode 2 (see 2202), only a print product having been output from its output unit is regarded as a processing target print product (see 2228).

In the mode 1, the administrator performs information analysis on an original irrespective of its output device. In the mode 2, not only the administrator but also other users may determine a suspended state of the original that is output by the apparatus itself.

An input operation 1 (see 2214) and an input operation 2 (see 2215) are configurations of scan lock function control and data detection. In the mode 0 (see 2200), the scan lock is in an ON state and the online data is (mainly) read (see 2232).

In mode 0 (see 2200), the administrator can manually turn off the scan lock (see 2230) with input operation 1 (see 2214). In the mode 1 (see 2201) and the mode 2 (see 2202), the scan lock is automatically turned off (see 2231) with input operation 1 (see 2214) and both the online and offline data (mainly the offline data) are read (see 2233) with input operation 2 (see 2215).

In the mode 0, the scan lock is turned on based on the detected online data. In the modes 1 and 2, the scan lock is internally turned off to mainly detect the offline data.

An output 2216 is a feedback content to be presented to the user from the display unit. In the mode 0 (see 2200), the display unit displays (see 2234) a message during a scan lock operation. In the mode 1 (see 2201), the display unit displays (see 2235) an analysis result of an original code on its screen. In the mode 2 (see 2202), the display unit displays a determination result of a suspended document and adds information to the log (see 2236). Operations in respective modes are described below.

Figure 12:
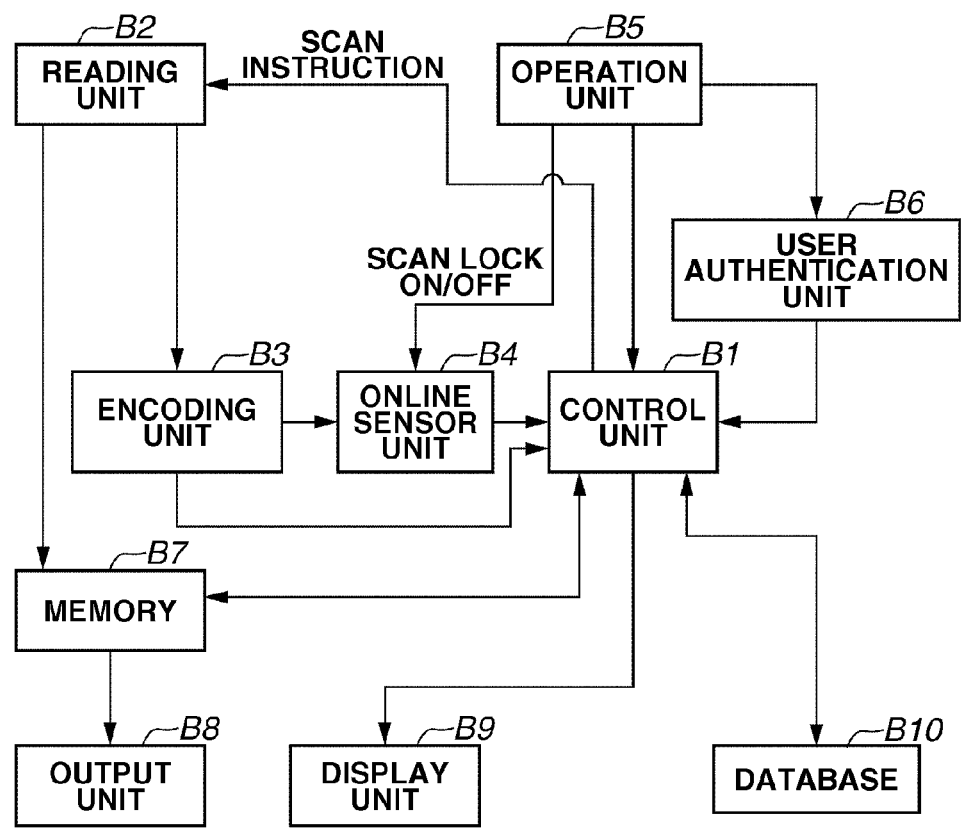
FIG. 12 is a block diagram illustrating an internal configuration of the apparatus.

An internal configuration of the apparatus is described below with reference to FIG. 12. A control unit B1 can perform control for each block of the apparatus. An operation unit B5 can receive operational instructions and setting entered from users. A user authentication unit B6 is a block capable of managing authentication of each user.

In a scanning operation, the control unit B1 instructs a scanner unit B2 to input an image. A decoding/encoding unit B3 and an online sensor unit B4 can decode embedded information from the image read by the scanner/reading unit B2. The control unit B1 receives the embedded information from the online sensor unit B4. An output unit B8 can print an image that is read out of a memory B7. A display unit B9 can display feedback information/data to be presented to users. A database unit B10 can store settings and logs of the apparatus.

Hereinafter, example operations in respective modes (i.e., mode 0, mode 1, and mode 2) are successively described below. First, a scan lock operation that can be performed by the apparatus in a scan lock mode (i.e., mode 0), namely in a normal copy operation, is described below.

Figure 13:
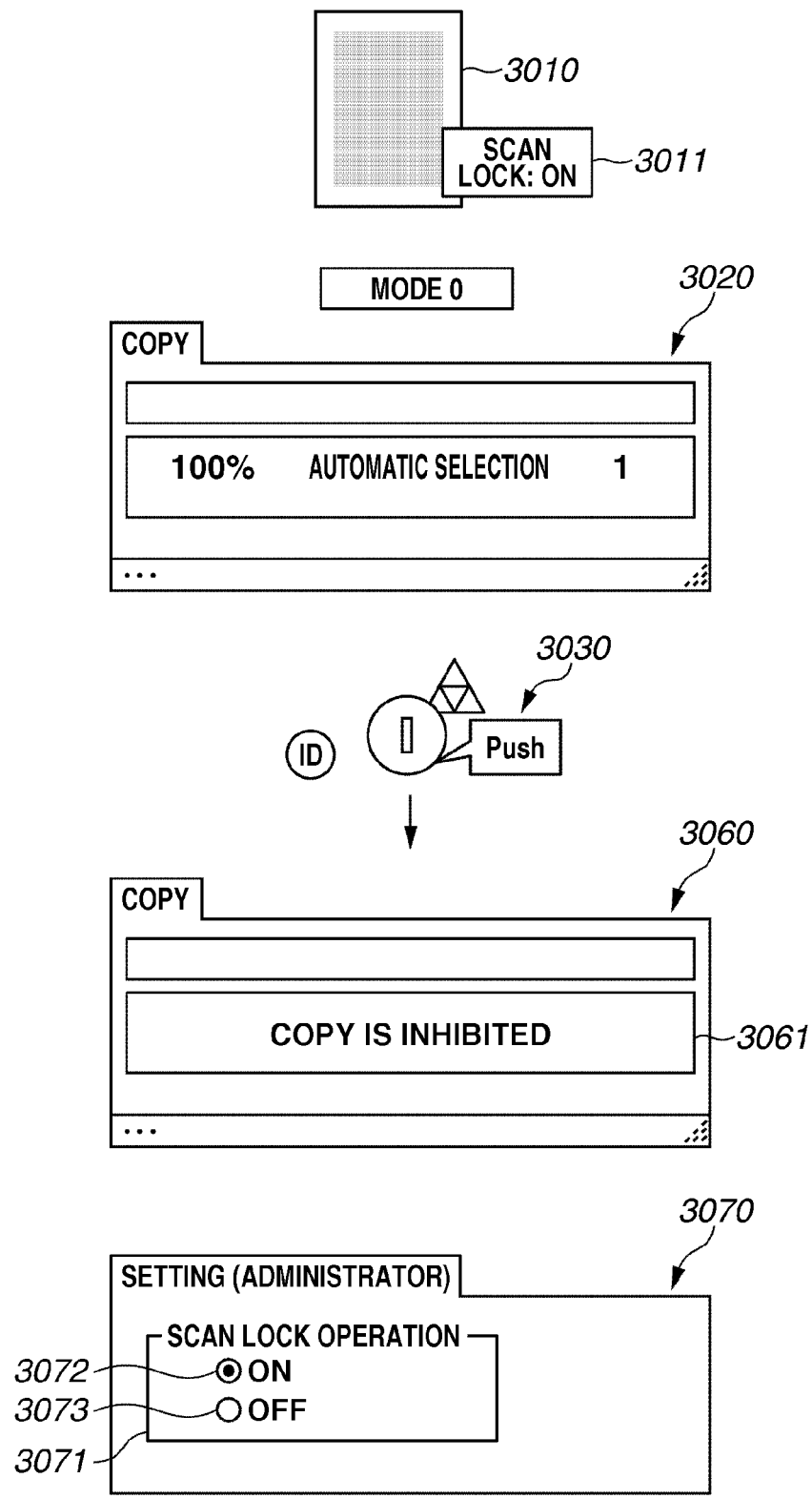
FIG. 13 illustrates an example of an operation unit of the apparatus in a mode 0.

An operation unit in mode 0 is described below with reference to FIG. 13. An original 3010 includes an online data 3011 indicating "SCAN LOCK: ON." In the mode 0, the apparatus performs a normal copy of the original 3010. A normal screen 3020 serves as an entrance to the operation unit in the mode 0.

A user sets the original 3010 on an automatic document feeder (i.e., ADF) or on a document positioning plate, namely on a scanner, and pushes a copy button 3030. The apparatus detects the online data 3011 indicating "SCAN LOCK: ON" on the original 3010, and causes a display unit 3060 to display a message 3061, such as "COPY IS INHIBITED." The message 3061 may be "SCAN LOCKED."

A "setting (administrator)" screen 3070 of the operation unit includes an "ON" button 3072 and an "OFF" button 3073 for a scan lock operation 3071. The administrator can change the scan lock operation by selecting the "ON" button 3072 or the "OFF" button 3073.

Figure 14:
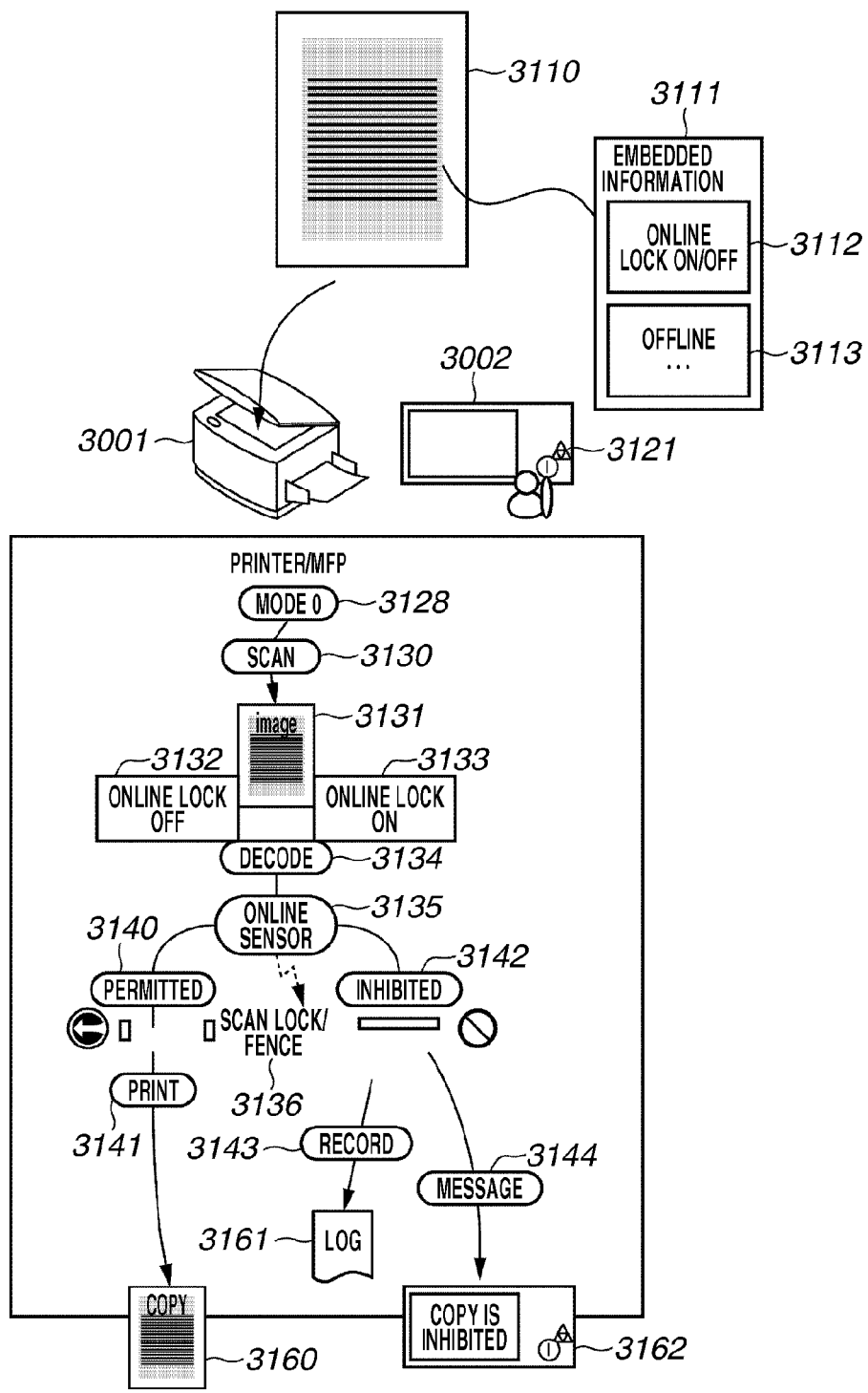
FIG. 14 illustrates an example operation in the mode 0, which is performed by the apparatus.

An operation in the mode 0 is described below with reference to FIG. 14. A document 3110 includes embedded information 3111, which includes online data 3112 and offline data 3113.

In the mode 0, the apparatus performs a normal copy of the document 3110. A user sets the document 3110 on the scanner and pushes a copy button 3121 of an operation unit 3002.

The apparatus identifies mode 0(see 3128) as operation mode. The apparatus performs scanning 3130 of the document 3110. A scanned image 3131 includes online data 3132 indicating "SCAN LOCK: OFF" and online data 3133 indicating "SCAN LOCK: ON."

A decoding unit 3134 decodes the image 3131. An online sensor unit 3135 operates a scan lock/fence 3136 based on a detection of the online data 3132 or 3133.

If the online sensor unit 3135 detects the online data 3133, the online sensor unit 3135 closes the scan lock/fence 3136 to bring the apparatus into an inhibited state 3142.

The apparatus causes the display unit to display a message 3144 indicating "COPY IS INHIBITED" 3162 to inform the user of the inhibited state 3142 (i.e., scan locked state). Meanwhile, the apparatus accesses the database unit to record (see 3143) the scan locked state as a log 3161.

If the online sensor unit 3135 does not detect the online data 3133, the online sensor unit 3135 opens the scan lock/fence 3136 to bring the apparatus into a permitted state 3140. In the permitted state 3140, data and images can be sent to the output unit that performs print (3141) processing based on received data and images. Thus, the apparatus can output a document 3160 as a copy of the document 3110.

Figure 15:
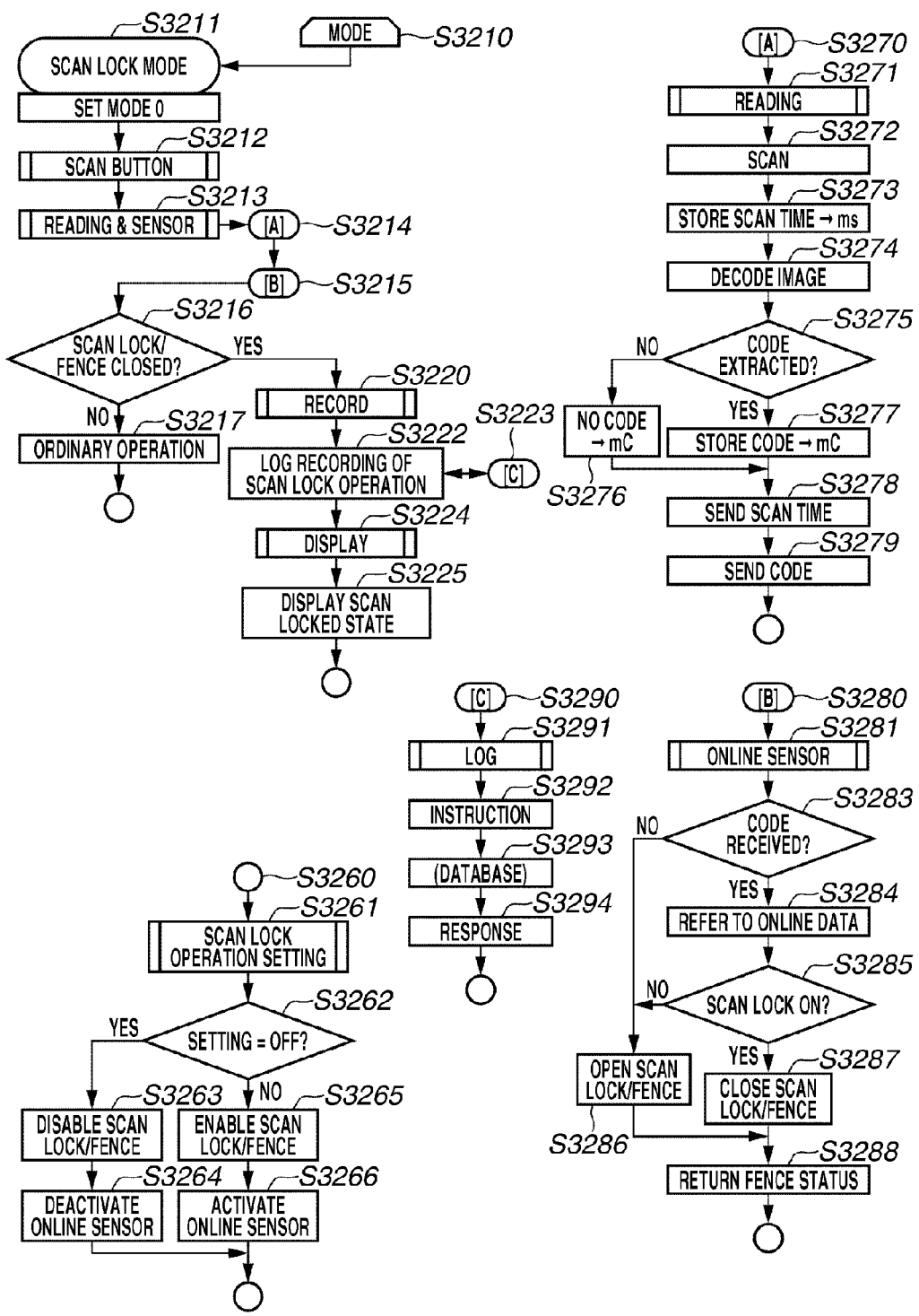
FIG. 15 is a flowchart illustrating example processing in the mode 0, which is performed by the apparatus.

FIG. 15 is a flowchart illustrating an operation in the mode 0. In step S3210, the apparatus shifts its operation mode. In step S3211, the control unit B1 starts the scan lock mode (i.e., sets the mode 0). In step S3212, the control unit B1 receives a signal indicating a selection of a scanning button from the operation unit B5. In step S3213, the apparatus starts reading and sensor processing. In step S3214, the apparatus executes processing routine [A]. In step S3215, the apparatus executes processing routine [B].

In step S3216, the control unit B1 determines whether the scan lock/fence is closed. If it is determined that the scan lock/fence is in the closed state (YES in step S3216), the processing proceeds to step S3220. If it is determined that the scan lock/fence is not in the closed state (NO in step S3216), the processing proceeds to step S3217. In step S3217, the control unit B1 performs normal copy operation (i.e., ordinary operation).

In step S3220, the apparatus starts recording processing. In step S3222, the control unit B1 requests the database unit B10 to record the scan lock operation as a log. In step S3223, the apparatus executes processing routine [C]. In step S3224, the apparatus starts display processing. In step S3225, the control unit B1 causes the display unit B9 to display the scan locked state. The processing routines [A], [B], and [C] are described below in detail.

Prior to the description for the processing routines [A], [B], and [C], scan lock operation setting processing is described below. In step S3261, the apparatus starts scan lock operation setting processing.

In step S3262, the control unit B1 determines whether a scan lock operation setting of the operation unit B5 is OFF. If the operation setting is OFF (YES in step S3262), the processing proceeds to step S3263. If the operation setting is OFF (NO in step S3262), the processing proceeds to step S3265.

In step S3263, the control unit B1 controls the online sensor unit B4 to disable the scan lock/fence. In step S3264, the control unit B1 controls the online sensor unit B4 to deactivate the online sensor.

In step S3265, the control unit B1 controls the online sensor unit B4 to enable the scan lock/fence. In step S3266, the control unit B1 controls the online sensor unit B4 to activate the online sensor.

Processing Routine [A] (Step S3270)

In step S3271, the apparatus starts reading processing. In step S3272, the control unit B1 controls the scanner unit B2 to perform scanning. In step S3273, the control unit B1 stores scanning date/time in the memory B7. In step S3274, the control unit B1 controls the decoding unit B3 to decode an image obtained by the scanning.

In step S3275, the control unit B1 determines whether a code is extracted by the decoding. If it is determined that no extracted code is present (NO in step S3275), the processing proceeds to step S3276. If it is determined that there is an extracted code (YES in step S3275), the processing proceeds to step S3277.

In step S3276, the control unit B1 stores information indicating "NO CODE" in the memory B7. In step S3277, the control unit B1 stores the extracted code in the memory B7. In step S3278, the control unit B1 sends the scanning date/time to a post-stage processing unit (i.e., the control unit B1 in the mode 0). In step S3279, the control unit B1 sends the extracted code to a post-stage processing unit (i.e., the online sensor unit B4 in the mode 0).

Processing Routine [B] (Step S3280)

In step S3281, the apparatus starts online sensor processing. In step S3283, the online sensor unit B4 determines whether the extracted code is received from the control unit B1. If reception of the code is confirmed (YES in step S3283), the processing proceeds to step S3284. If the extracted code is not received (NO in step S3283), the processing proceeds to step S3286.

In step S3284, the online sensor unit B4 refers to the online data stored in the memory B7.

In step S3285, the online sensor unit B4 determines whether the online data indicates that the scan lock is ON. If it is determined that the scan lock is ON (YES in step S3285), the processing proceeds to step S3287. If it is determined that the scan lock is not ON (NO in step S3285), the processing proceeds to step S3286.

If it is desired to deactivate the scan lock function, the control flow can be modified so as to enable the online sensor unit B4 to skip the reading of online data.

In step S3286, the online sensor unit B4 performs control for opening the scan lock/fence. In step S3287, the online sensor unit B4 performs control for closing the scan lock/fence. In step S3288, the online sensor unit B4 sends the status of the scan lock/fence to a post-stage processing unit (i.e., the control unit B1 in the mode 0).

Processing Routine [C] (Step S3290)

In step S3291, the apparatus starts log processing. In step S3292, the database unit B10 receives an instruction from the control unit B1. In step S3293, the database unit B10 performs database processing. In step S3294, the database unit B10 sends a response to the control unit B1.

Next, an operation for displaying the content of information embedded in an original that can be performed by the apparatus in the information analysis mode (i.e., mode 1) is described below.

Figure 16:
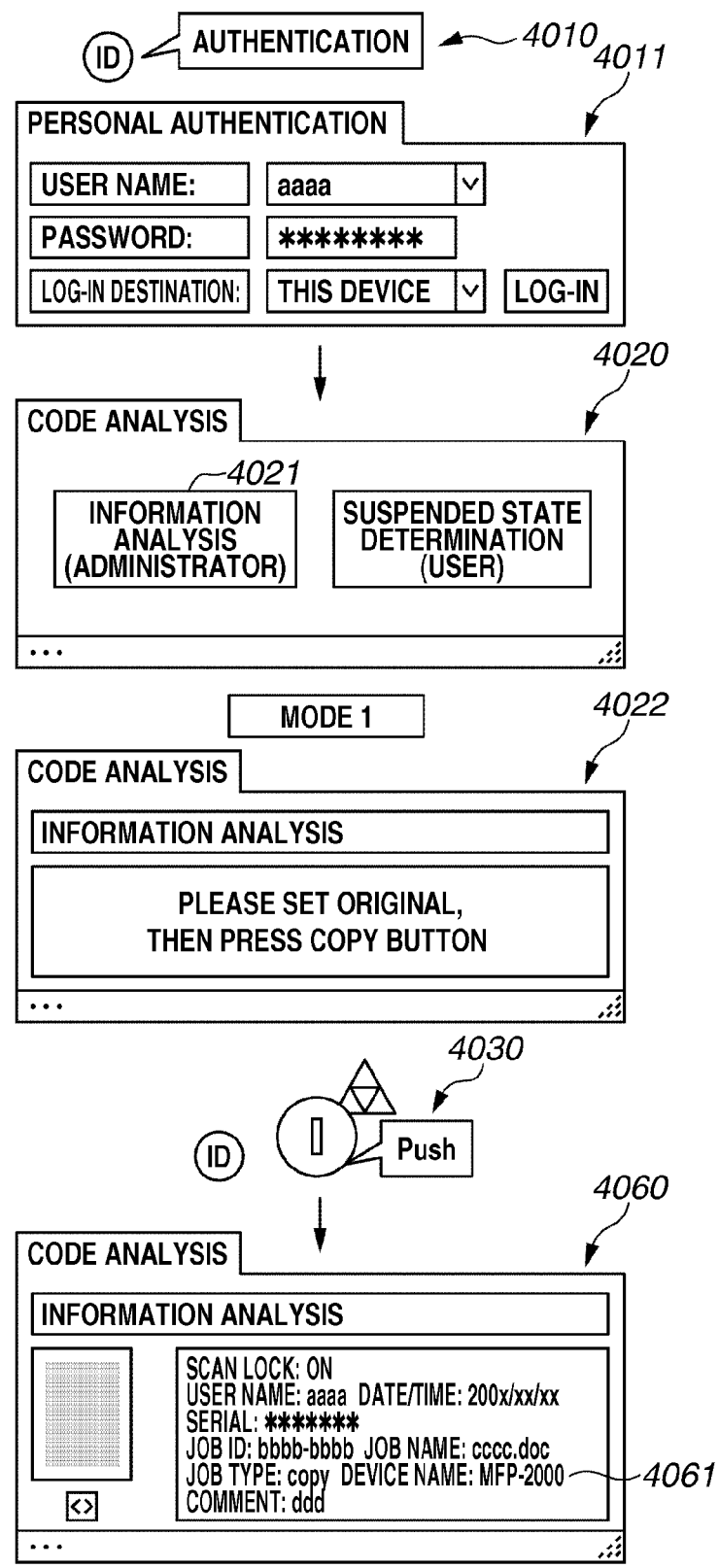
FIG. 16 illustrates an example of an operation unit of the apparatus in a mode 1.

An operation unit in mode 1 is described below with reference to FIG. 16. In the mode 1, the apparatus displays an embedded information content included in the original. A user (or an administrator) presses an authentication button 4010 of the operation unit B5. As an "individual authentication" screen 4011 is displayed, the user (or the administrator) inputs a user name and a password to log in the apparatus.

A "code analysis" screen 4020 serves as an entrance to the operation unit in the model. If an "information analysis (administrator)" button 4021 on the "code analysis" screen 4020 is selected, the apparatus shifts its operation mode to the mode 1.

The "information analysis (administrator)" button 4021 can be selected by a user only when an administrative right of the user is authenticated. If the administrative right of the user is not authenticated, the apparatus does not display or gray out the "information analysis (administrator)" button 4021 so as to prevent the user from selecting the button 4021.

As an "information analysis" screen 4022 is displayed, the administrator sets the original on the scanner and presses a copy button 4030. The apparatus analyzes embedded information included in the original. As a result, the apparatus causes a display unit 4060 to display a content 4061 of the extracted embedded information.

A display area of the content 4061 is adjustable. The content 4061 is information having a readable format that the user can refer to. Therefore, the display unit 4060 may not display all of the embedded information.

Figure 17:
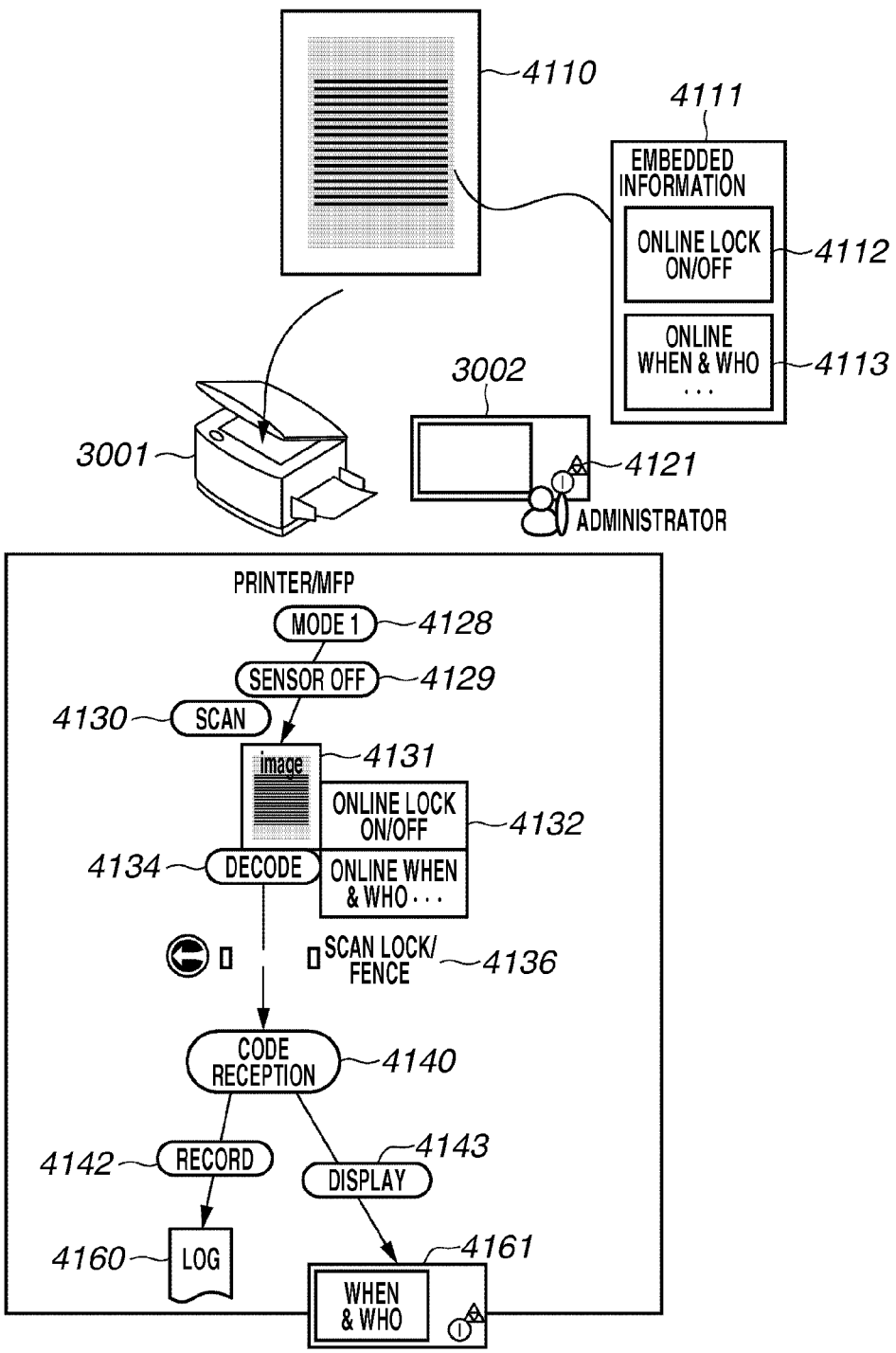
FIG. 17 illustrates an example operation in the mode 1, which is performed by the apparatus.

An operation in mode 1 is described below with reference to FIG. 17. A document 4110 includes embedded information 4111, which includes online data 4112 and offline data 4113. In the mode 1, the apparatus displays the content of the information embedded in the document 4110.

The administrator performs individual authentication via the operation unit 3002 to log in the apparatus with the administrative right. In this state, if the administrator selects an "information analysis" button on the "code analysis" screen of the operation unit 3002, the administrator can identify the mode 1 (see 4128) as the operation mode.

The administrator sets the document 4110 on the scanner and presses a copy button 4121 of the operation unit 3002. The apparatus turns off (see 4129) the online sensor as internal processing and causes the scanner unit B2 to scan (see 4130) the document 4110.

A scanned image 4131 includes embedded information 4132. The embedded information includes online data indicating ON/OFF of the scan lock setting and offline data indicating printing operation information. It also indicates online when & who.

A decode unit 4134 decodes the image 4131. A scan lock/fence 4136 is in an opened state because the online sensor unit is in an OFF state (see 4129) as described above. Namely, the apparatus is in the permitted state where data and images can be sent to a post-stage processing unit.

An extracted code (embedded information) 4140 is subjected to display processing (see 4143). A display unit displays (see 4143) the content of the embedded information (see 4161). The apparatus accesses the database unit to record (see 4142) the information analyzing operation as a log 4160.

Figure 18:
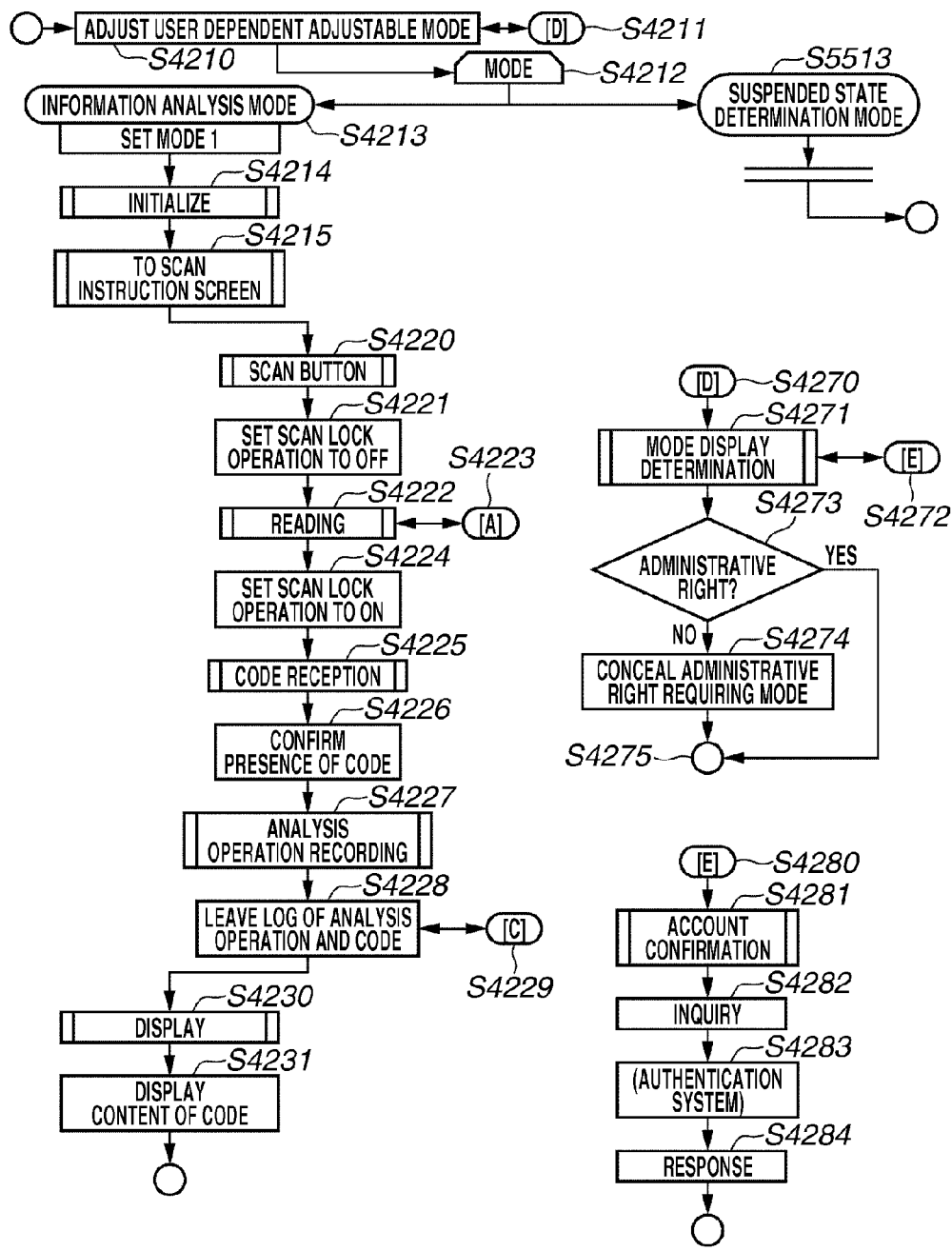
FIG. 18 is a flowchart illustrating example processing in the mode 1, which is performed by the apparatus.

FIG. 18 is a flowchart illustrating an operation in the mode 1. In step S4210, the control unit B1 adjusts a selectable mode according to each user (i.e., user dependent adjustable mode). In step S4211, the apparatus executes processing routine [D]. In step S4212, the apparatus shifts its operation mode. Processing to be performed in step S5513 is described later. In step S4213, the control unit B1 receives a signal indicating a selection of the "information analysis (administrator)" button from the operation unit B5 and starts the information analysis mode (i.e., sets the mode 1).

In step S4214, the apparatus starts initialization processing for the information analysis mode. In step S4215, the control unit B1 controls the display unit B9 to output a scanning instruction message "PLEASE SET ORIGINAL, THEN PRESS COPY BUTTON" on a "code analysis"-"information analysis" screen of the operation unit B5. In step S4220, the control unit B1 receives a signal indicating a selection of the scanning button from the operation unit B5. In step S4221, the control unit B1 sets the scan lock operation setting to OFF.

In step S4222, the apparatus starts reading processing. In step S4223, the apparatus executes the processing routine [A]. In step S4224, the control unit B1 sets the scan lock operation setting to ON. In step S4225, the apparatus starts code reception processing. In step S4226, the control unit B1 confirms the code (embedded information) stored in the memory B7 and sends it to a post-stage processing unit.

In step S4227, the apparatus starts recording processing. In step S4228, the control unit B1 requests the database unit B10 to record the analysis operation and the code as a log. In step S4229, the apparatus executes the processing routine [C]. In step S4230, the apparatus starts display processing. In step S4231, the control unit B1 controls the display unit B9 to display the content of the code information.

Hereinafter, processing routines [D] and [E] are described in detail.

Processing Routine [D] (Step S4270)

In step S4271, the apparatus starts mode display determination processing. In step S4272, the apparatus executes the processing routine [E].

In step S4273, the control unit B1 determines whether the user's authority is an administrative right. If it is determined that the user's authority is the administrative right (YES in step S4273), the processing proceeds to step S4275. If it is determined that the user's authority is not the administrative right (NO in step S4273), the processing proceeds to step S4274. In step S4274, the control unit B1 conceals (or grayouts) any mode that uses the administrative right when it is displayed on the operation unit B5.

In the flowchart illustrated in FIG. 18, the control unit B1 checks the administrative right in the determination step. Alternatively, as described above with reference to FIG. 11, the control unit B1 can control the selectable mode for each user referring to authority conditions in each mode and authority information of the present user obtained from the user authentication unit B6.

Processing Routine [E] (Step S4280)

In step S4281, the apparatus starts account confirmation processing. In step S4282, the user authentication unit B6 receives an inquiry from the control unit B1. In step S4283, the user authentication unit B6 performs authentication system processing. In step S4284, the user authentication unit B6 sends a response to the control unit B1.

Figure 19:
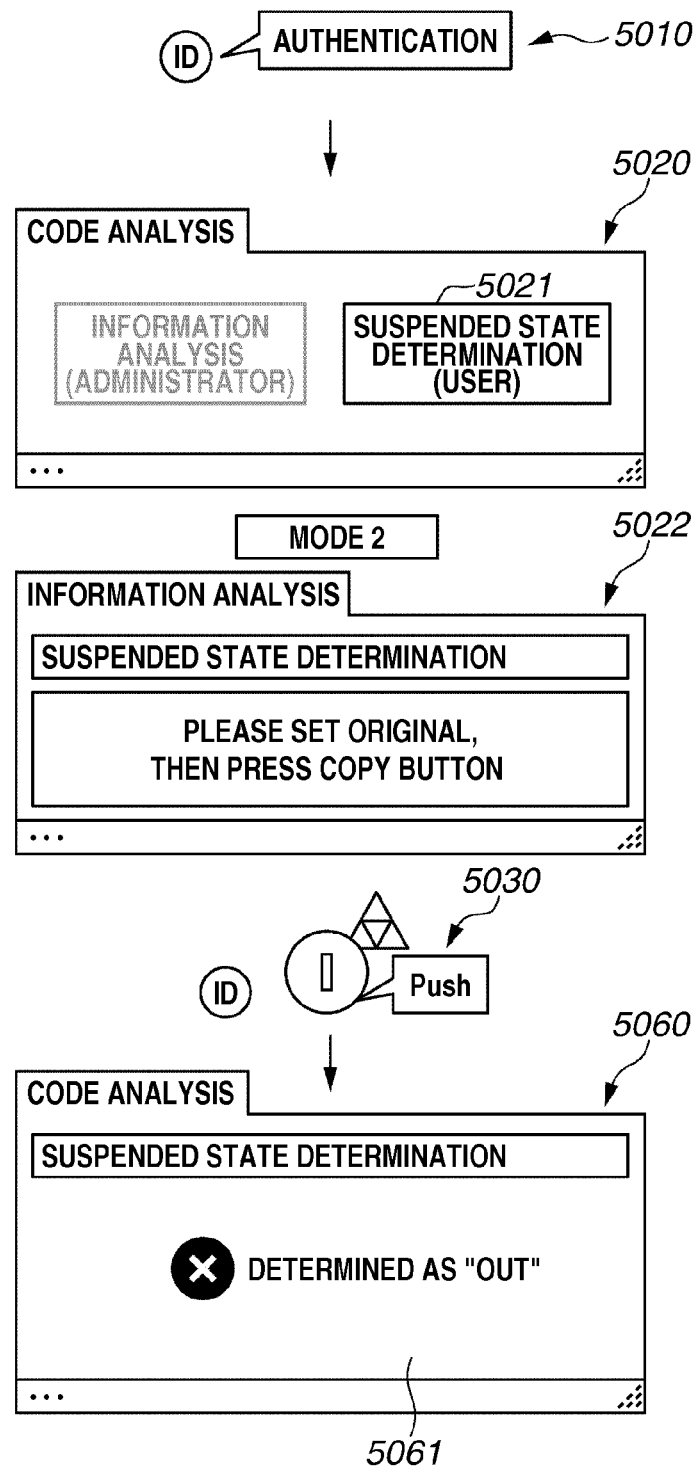
FIG. 19 illustrates an example of a basic operation unit of the apparatus in a mode 2.

Finally, an operation for displaying a determination result of a document in a suspended state that can be performed by the apparatus in the suspended state determination mode (i.e., mode 2) is described below. An operation unit in the mode 2 is described below with reference to FIG. 19.

In the mode 2, the apparatus displays a determination result of a suspended document (i.e., a document in a suspended state). A user presses an authentication button 5010 of the operation unit B5, and performs authentication processing similar to that described with reference to FIG. 16 to log in the apparatus. A "code analysis" screen 5020 serves as an entrance to the operation unit in the mode 2.

If the user selects a "suspended state determination (user)" button 5021 on the "code analysis" screen 5020, the apparatus shifts its operation mode to the mode 2. In this case, a gray-out display of the information analysis (administrator) button indicates that this button is not selectable and because the user is authenticated as having a user's authority.

As an "information analysis" screen 5022 is displayed, the user sets an original on the scanner and presses a copy button 5030. The apparatus analyzes embedded information included in the suspended document, and performs suspended state determination referring to condition settings (described below) and analysis operation information. Then, the apparatus causes a display unit 5060 to display a determination result 5061.

To increase the number of executions in the mode 2 (i.e., executions of the suspended state determination), there is an intent to allow any user having a user's authority to participate. In this respect, the apparatus performs the display of the determination result 5061 in such a way so as to prevent any issue from being caused by the participation of a user having a user's authority. The apparatus does not basically display the content of the embedded information.

For example, the apparatus performs the following displays of the determination result 5061.

SAFE (if determined as a document not suspended)
OUT (if determined as a suspended document)
EXCLUSION (if excluded as a result of determination)
NO CODE (if not subjected to the determination)

Figure 20:
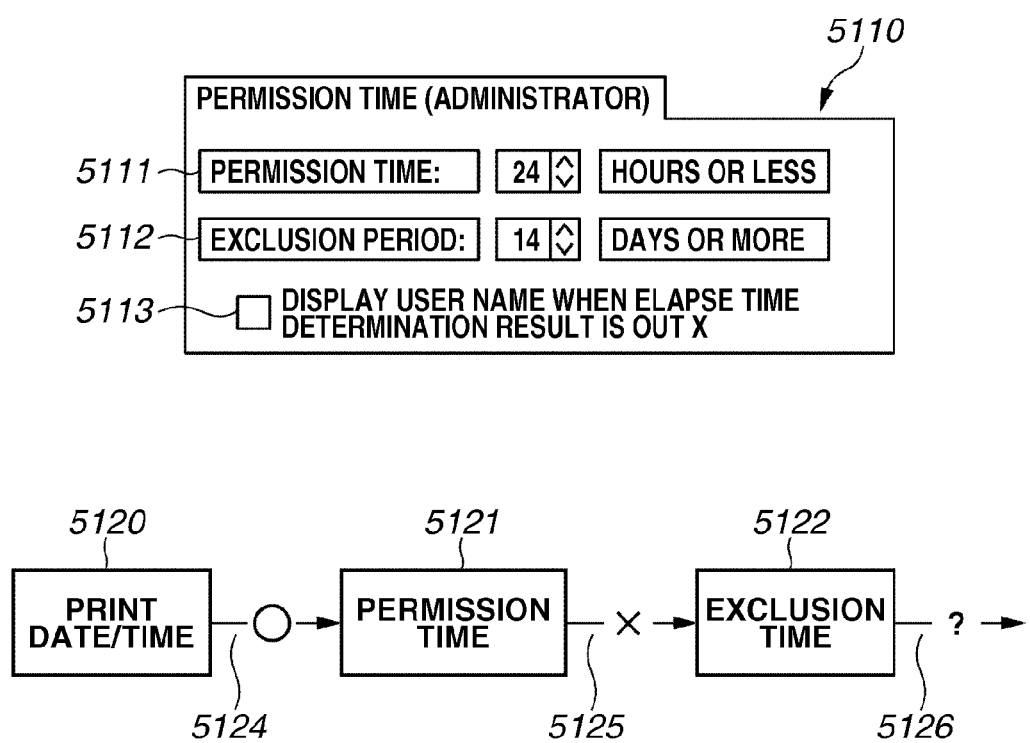
FIG. 20 illustrates an example of an operation setting unit of the apparatus in the mode 2.

An operation setting unit in mode 2 is described below with reference to FIG. 20. An administrator can set permission time 5111 and exclusion period 5112 on a "permission time (administrator) setting" screen 5110. According to the example illustrated in FIG. 20, a default value of the permission time 5111 is "24 hours or less" and a default value of the exclusion period 5112 is "14 days or more."

The permission time 5111 is a time during which a print product can be left in a suspended state. The exclusion period 5112 is a period that is excluded from the suspended state determination. For example, if a long period of time has passed, it is better to regard that the print product is no longer in a suspended state.

A determination result in relation to the permission time 5111 and the exclusion period 5112 is described below. If a permission time 5121 has not elapsed yet since a print date/time 5120, the document is determined as a document not suspended. Therefore, in this case, the determination result 5061 is "SAFE" (see 5124).

If the exclusion period has elapsed since the print date/time 5120, the document is excluded. Therefore, the determination result 5061 becomes "EXCLUSION" (see 5126).

If the permission time 5121 has elapsed but an exclusion period 5122 has not elapsed yet, the document is determined as a suspended document. Therefore, the determination result 5061 is "OUT" (see 5125).

The "permission time (administrator) setting" screen 5110 further includes a "DISPLAY USER NAME WHEN ELAPSE TIME DETERMINATION RESULT IS OUT" check box 5113. According to the example illustrated in FIG. 20, a default state of the check box 5113 is OFF.

If the state of the check box 5113 is ON, the apparatus displays a user name referring to the embedded information in a case where the document is determined as a suspended document (i.e., when the determination result 5061 is "OUT"). This check box is available to inquire a creator of the document about how to handle a print product (i.e., the suspended document) in a case where the user designates the mode 2 operation and it is determined that the document is in a suspended state.

Figure 21:
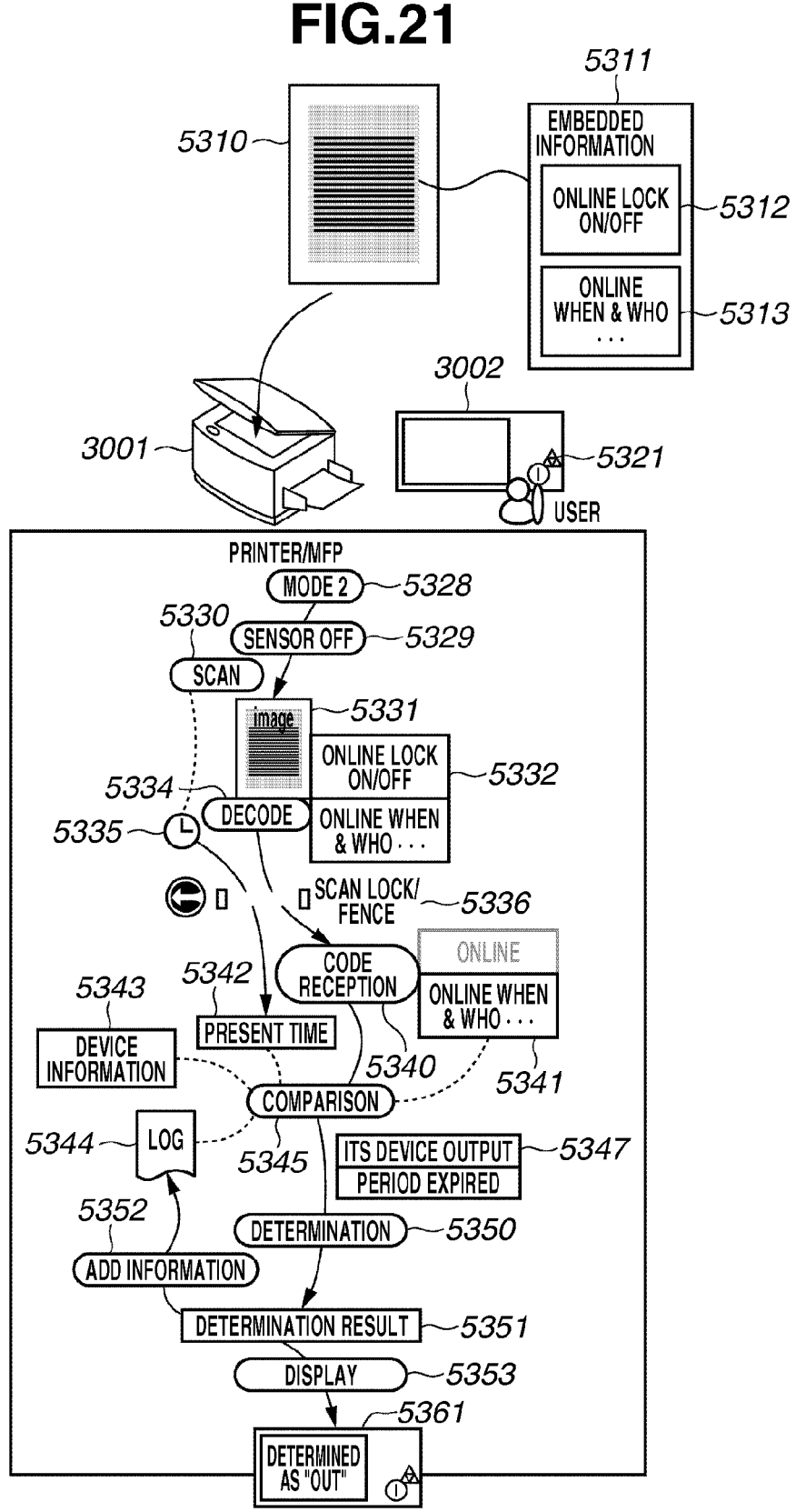
FIG. 21 illustrates a basic operation in the mode 2, which is performed by the apparatus.

An operation in mode 2 is described below with reference to FIG. 21. A document 5310 includes embedded information 5311, which includes online data 5312 and offline data 5313. In the mode 2, the apparatus determines a suspended state of the document 5310 and displays a result of the determination.

A user performs individual authentication via the operation unit 3002 to log in the apparatus. In this state, if the user selects a "suspended state determination" button on the "code analysis" screen of the operation unit 3002, the user can identify the mode 2 (see 5328) as the operation mode.

The user sets the document 5310 on the scanner and presses a copy button 5321 of the operation unit 3002. The apparatus turns off (see 5329) the online sensor as internal processing and scans (see 5330) the document 5310.

A scanned image 5331 includes embedded information 5332. The embedded information includes online data indicating ON/OFF of the scan lock setting and offline data indicating printing operation information. A decoding unit 5334 decodes the image 5331.

The apparatus records a time 5335 of the scanning 5330. A scan lock/fence 5336 is in an opened state because the online sensor unit is in the OFF state (see 5329) as described above. Namely, the apparatus is in the permitted state where data and images can be sent to a post-stage processing unit.

The apparatus compares (see 5345) an extracted code (embedded information) 5340, mainly offline data 5341, with present time 5342 (i.e., the above-described scanning date/time 5335), unique device information 5343 of the apparatus, and a log 5344.

As a result of the comparison, the apparatus obtains "device own output" and "period expiration" (see 5347). The apparatus performs a determination (see 5350) based on the information 5347 and obtains a determination result 5351. The determination result 5351 is subjected to display processing (see 5353) and a display unit displays (see 5361) the determination result. The apparatus further records (see 5352) the determination result and the determination operation as additional information to the log 5344.

The "ADD INFORMATION" in the above-described additional information recording operation 5252 is described below in more detail.

Figure 22:
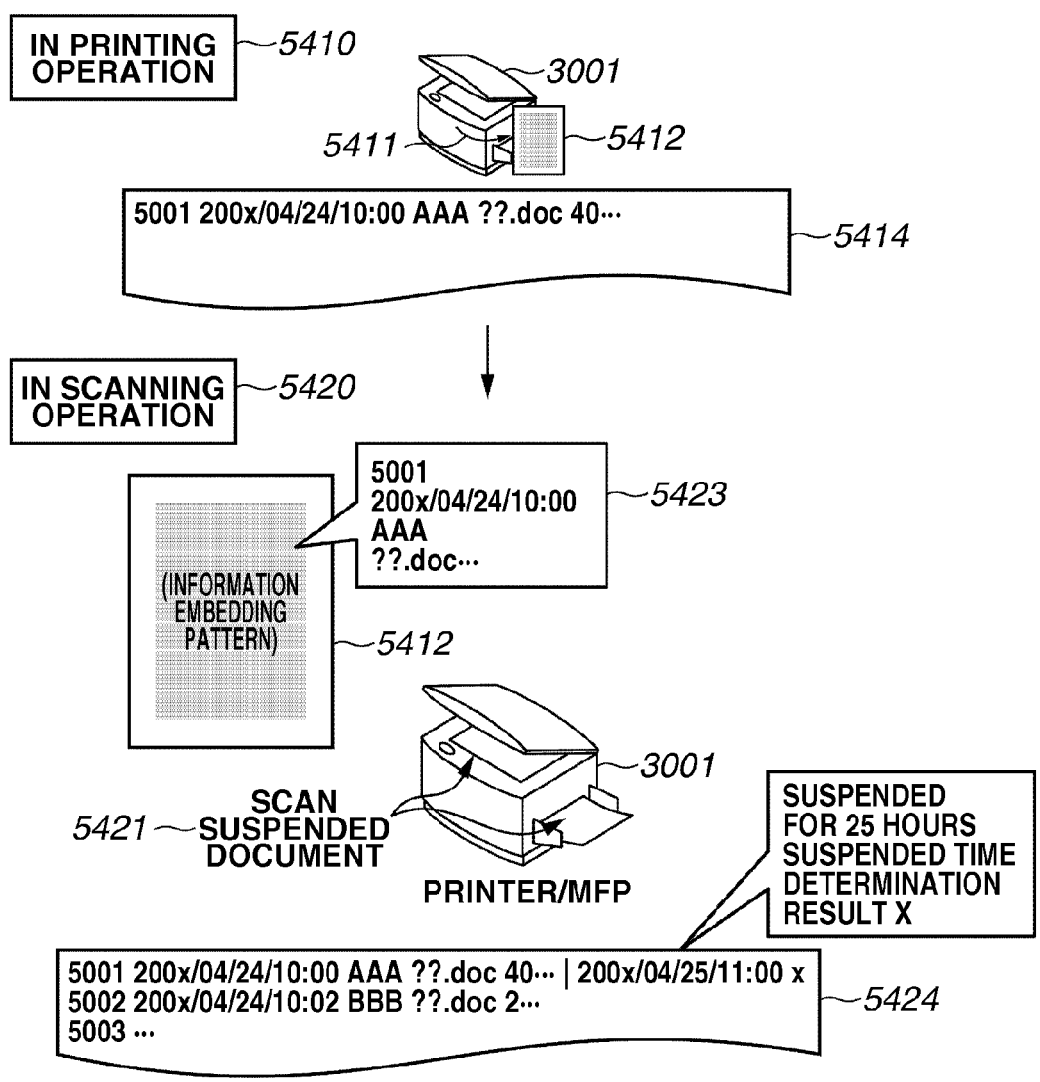
FIG. 22 illustrates an application operation in the mode 2, which is performed by the apparatus.

An application operation in mode 2 is described below with reference to FIG. 22. First, in a printing operation 5410, the apparatus (i.e., MFP 3001) prints (see 5411) a document 5412 including embedded information. The apparatus records the print operation 5411 as a print log 5414.

In a scanning operation 5420, the apparatus (i.e., MFP 3001) scans (see 5421) the document 5412 including the embedded information. It is now assumed that, in the mode 2, the document 5412 is printed (see 5410) as described above and is left for 25 hours in a discharge portion, and then the document 5412 is scanned (see 5421).

In this case, offline data 5423 embedded in the document 5412 is printing operation information. If device unique information stored in the offline data 5423 coincides with the apparatus currently executing the analysis operation, the document can be regarded as a device own output.

If the document is a device own output, its print log 5424 includes recording entry information that matches the offline data 5423. In this case, the result of the suspended state determination is "OUT." The print log 5424 includes the determination result as entry information additionally recorded.

On the contrary, the document 5412 can be determined as a device own output based on the presence of an entry that matches the embedded information recorded in the print log.

The following is example that the administrator may have.

The administrator wants to collect information relating to a suspended document (e.g., user name of a suspended print product, degree of a suspended state, etc.)

The administrator wants to warn a user not to frequently leave a print product in a suspended state.

The suspended state determination in mode 2 can be executed with a user's authority. If a user prints a document and leaves it in a suspended state, an apparatus can display how the document is handled and can record a determination result as a log. The apparatus can also additionally record determination processing and determination information as print history (i.e., record scanning history as print history) The administrator can collect apparatus logs and can count the determination result of the suspended document that has been performed by users.

Figure 23:
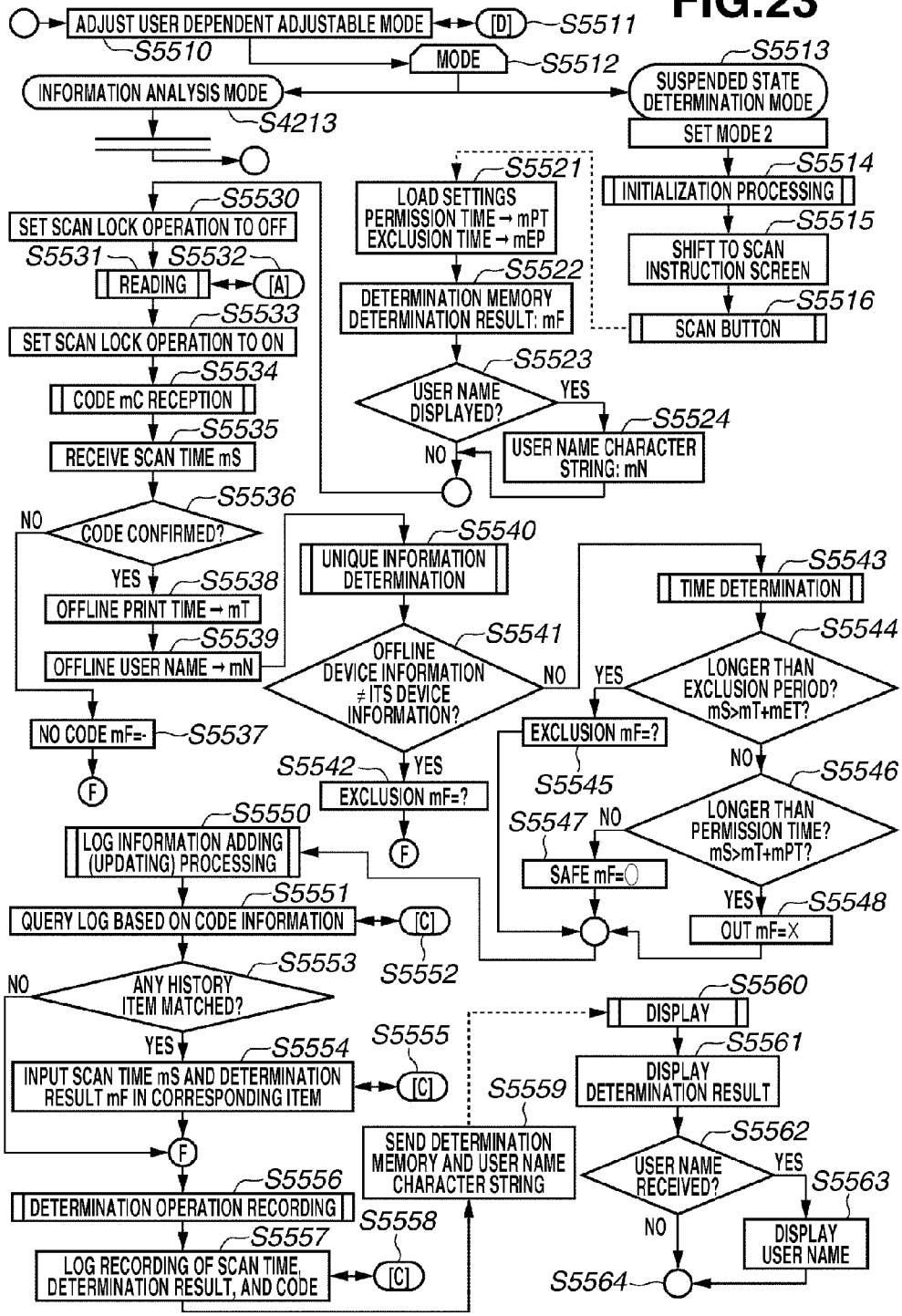
FIG. 23 is a flowchart illustrating example processing in the mode 2, which is performed by the apparatus.

An operation in mode 1 is described below with reference to a flowchart illustrated in FIG. 23. In step S5510, the control unit B1 adjusts a selectable mode according to each user. In step S5511, the apparatus executes the processing routine [D].

In step S5512, the apparatus shifts its operation mode. In step 5513, the control unit B1 receives a signal indicating a selection of the "suspended state determination (user)" button from the operation unit B5 and starts the suspended state determination mode (i.e., sets the mode 2).

In step S5514, the apparatus starts initialization processing for the suspended state determination mode. In step S5515, the control unit B1 controls the display unit B9 to display a scanning instruction message "PLEASE SET ORIGINAL, THEN PRESS COPY BUTTON", which is to be presented to the user, on a "code analysis"-"suspended state determination" screen of the operation unit B5. In step S5516, the control unit B1 receives a signal indicating that the scanning button has been pressed from the operation unit B5.

In step S5521, the control unit B1 loads setting values of the permission time and the exclusion period having been set on the "permission time (administrator)" screen of the operation unit B5 into the memory B7. In step S5522, the control unit B1 secures a determination memory in the memory B7.

In step S5523, the control unit B1 determines whether a "DISPLAY USER NAME" check box of the "permission time (administrator)" screen of the operation unit B5 is ON. If it is determined that the "DISPLAY USER NAME" check box is ON (YES in step S5523), the processing proceeds to step S5524. If it is determined that the "DISPLAY USER NAME" check box is not ON (NO in step S5523), the processing proceeds to step S5530. In step S5224, the control unit B1 secures a memory for a character string of the user name in the memory B7. In step S5530, the control unit B1 sets the scan lock operation setting to OFF.

In step S5531, the apparatus starts reading processing. In step S5532, the apparatus executes the processing routine [A]. In step S5533, the control unit B1 sets the scan lock operation setting to ON. In step S5534, the apparatus starts code reception processing. In step S5535, the control unit B1 confirms the scanning date/time stored in the memory B7 and sends the scanning date/time to a post-stage processing unit.

In step S5536, the control unit B1 determines whether there is the code (embedded information) in the memory B7. If it is determined that the code is present (YES in step S5536), the processing proceeds to step S5538. If it is determined that the code is not present (NO in step S5536), the processing proceeds to step S5537.

In step S5537, the control unit B1 stores a determination result "NO CODE" in the determination memory of the memory B7. In step S5538, the control unit B1 stores a print time (i.e., offline data of the code) in the memory B7. In step S5539, the control unit B1 stores a user name (i.e., offline data of the code) in the memory B7, if the character string of the user name is secured.

In step S5540, the apparatus starts unique information determination processing. In step S5541, the control unit B1 determines whether the offline device information is different from its device information, namely determines whether the original is a print product printed by the MFP 3001. If it is determined that the offline device information is different from its device information (YES in step S5541), the processing proceeds to step S5542. If it is determined that the offline device information is not different from its device information (NO in step S5541), the processing proceeds to step S5543.

In step S5542, the control unit B1 determines that the original is not a processing target print product. The control unit B1 stores a determination result "EXCLUSION" in a determination memory of the memory B7. If the original is not identified as a processing target print product, the apparatus does not perform a display based on the trace information for the original.

In step S5543, the control unit B1 determines that the original is a processing target print product. Then, the apparatus starts time determination processing. As described above, in the suspended state determination mode, it is determined whether the original is a print product printed by the apparatus that performs the suspended state determination.

If it is determined that the print product is printed by the apparatus, the control unit B1 determines that the original is a processing target print product as a result of a processing target determination. If it is determined that the print product is not printed by the apparatus, the control unit B1 determines that the original is not a processing target print product as a result of the processing target determination.

On the other hand, in the above-described information analysis mode, the control unit B1 determines that the original is a processing target print product even when the original is not printed by the apparatus that performs the information analysis.

Switching the original to be processed as a target print product according to the mode as described above can prevent the apparatus from executing the processing meaninglessly. For example, if an original cannot be processed in the suspended state determination mode, the original can be excluded from the analysis.

In step S5544, the control unit B1 determines whether the exclusion period has expired. If it is determined that the exclusion period has expired (YES in step S5544), the processing proceeds to step S5545. If it is determined that the exclusion period is not yet expired (NO in step S5544), the processing proceeds to step S5546.

In step S5545, the control unit B1 stores a determination result "EXCLUSION" in the determination memory of the memory B7. In step S5546, the control unit B1 determines whether the permission time has elapsed.

If it is determined that the permission time has elapsed (YES in step S5546), the processing proceeds to step S5548.

If it is determined that the permission time is not yet elapsed (NO in step S5546), the processing proceeds to step S5547.

In step S5547, the control unit B1 stores a determination result "SAFE" in the determination memory of the memory B7. In step S5548, the control unit B1 stores a determination result "OUT" in the determination memory of the memory B7.

In step S5550, the apparatus starts log information adding processing. In step S5551, the control unit B1 requests the database unit B10 to query the log based on code information. In step S5552, the apparatus executes the processing routine [C].

In step S5553, the control unit B1 determines whether there is a history item, which is matched, based on a response from the database unit B10. If it is determined that a history item is present (YES in step S5553), the processing proceeds to step S5554. If it is determined that no history item is present (NO in step S5553), the processing proceeds to step S5556.

In step S5556, the control unit B1 requests the database unit B10 to add information to the corresponding history items of the memory B7 relating to the scanning date/time and the determination result. In step S5555, the apparatus executes the processing routine [C].

In step S5556, the apparatus starts determination operation recording processing. In step S5557, the control unit B1 requests the database unit B10 to perform log recording of the scanning date/time, the determination result, and the code in the memory B7. In step S5558, the apparatus executes the processing routine [C]. In step S5559, the control unit B1 sends the determination memory and the user name character string to a post-stage processing unit.

In step S5560, the apparatus executes display processing. In step S5561, the control unit B1 controls the display unit B9 to display the determination result of the determination memory.

In step S5562, the control unit B1 determines whether the user name character string is received. If it is determined that the user name character string is received (YES in step S5562), the processing proceeds to step S5563. If it is determined that the user name character string is not received (NO in step S5562), the processing proceeds to step S5564 (i.e., End). In step S5563, the control unit B1 controls the display unit B9 to display the user name.

As described above, an apparatus according to the second exemplary embodiment can analyze embedded information and display a result. The second exemplary embodiment can provide an apparatus that has a plurality of operation modes (e.g., a standard copy mode, an information analysis mode, a suspended state determination mode) according to a device purpose.

A third exemplary embodiment of the present invention is described below with reference to the drawings. In the present exemplary embodiment, the MFP 30 includes two or more reading units (2A, 2B) as illustrated in FIG. 24.

Figure 24:
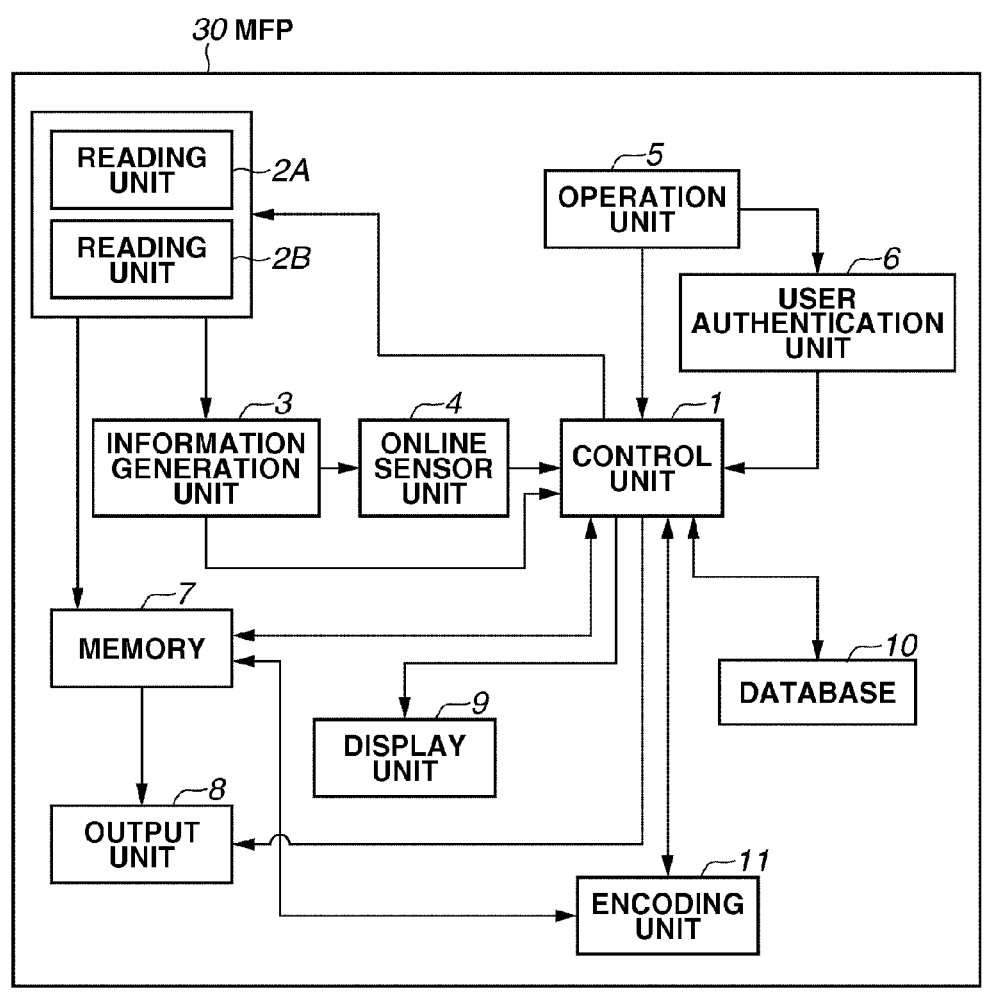
FIG. 24 is a block diagram of an MFP according to a third exemplary embodiment.

The MFP 30 illustrated in FIG. 24 includes the reading units (2A, 2B) and the online sensor unit 4 that are differently configured compared to those of the MFP 3001 illustrated in FIG. 1. The MFP 30 is similar to the MFP 3001 in the rest of the configuration, although the description for the rest is not repeated.

As illustrated in FIG. 24, in a case where two or more reading units (2A, 2B) are provided, the MFP 30 can execute two types of reading operations on an original (i.e., a target to be scanned) processed by two-sided printing. The MFP 30 can simultaneously scan two surfaces of an original using two reading units 2A and 2B during a single conveyance operation of the original. In other words, the present exemplary embodiment can realize a high-speed scanning operation (i.e., can quickly generate image data).

In the present exemplary embodiment, the reading method using two reading units (2A, 2B) as described above may be defined as a 1-pass reading method. Furthermore, in a case where the MFP 30 uses only one reading unit (e.g., 2A) to read an original processed by two-sided printing, the reading unit 2A performs scanning on one surface of the original during the first conveyance operation and then performs scanning on the other surface (i.e., reverse surface) of the original during the second conveyance operation.

Then, the MFP 30 generates image data of two surfaces of the original obtained by scanning during two conveyance operations. According to this reading method, the reading speed is slower compared to that of the 1-pass reading method. In the present exemplary embodiment, the latter reading method may be defined as a 2-pass reading method.

The MFP 30 according to the present exemplary embodiment can be configured to include a plurality of online sensor units 4. In a case where the MFP 30 can use two or more online sensor units 4 simultaneously, the MFP 30 can quickly acquire the inhibition information 2103 because the processing time for each online sensor unit 4 decreases correspondingly.

Therefore, even in a case where the reading operation of an original is performed according to the 1-pass reading method (i.e., higher-speed reading method), the MFP 30 can speedily acquire the inhibition information 2103 at a speed comparable to the reading speed.

On the other hand, in a case where the number of the available online sensor unit 4 is only one, the processing time used for the online sensor unit 4 to acquire the inhibition information 2103 is too much longer compared to the reading speed according to the 1-pass reading method. Therefore, a great amount of image data is pooled if the original is continuously scanned according to the 1-pass reading method. This may cause an error.

The present exemplary embodiment determines whether two or more online sensor units 4 are present (i.e., detects an inhibition information acquisition function) and selects the reading method between the 1-pass reading method and the 2-pass reading method according to the detected acquisition function.

Figure 25:
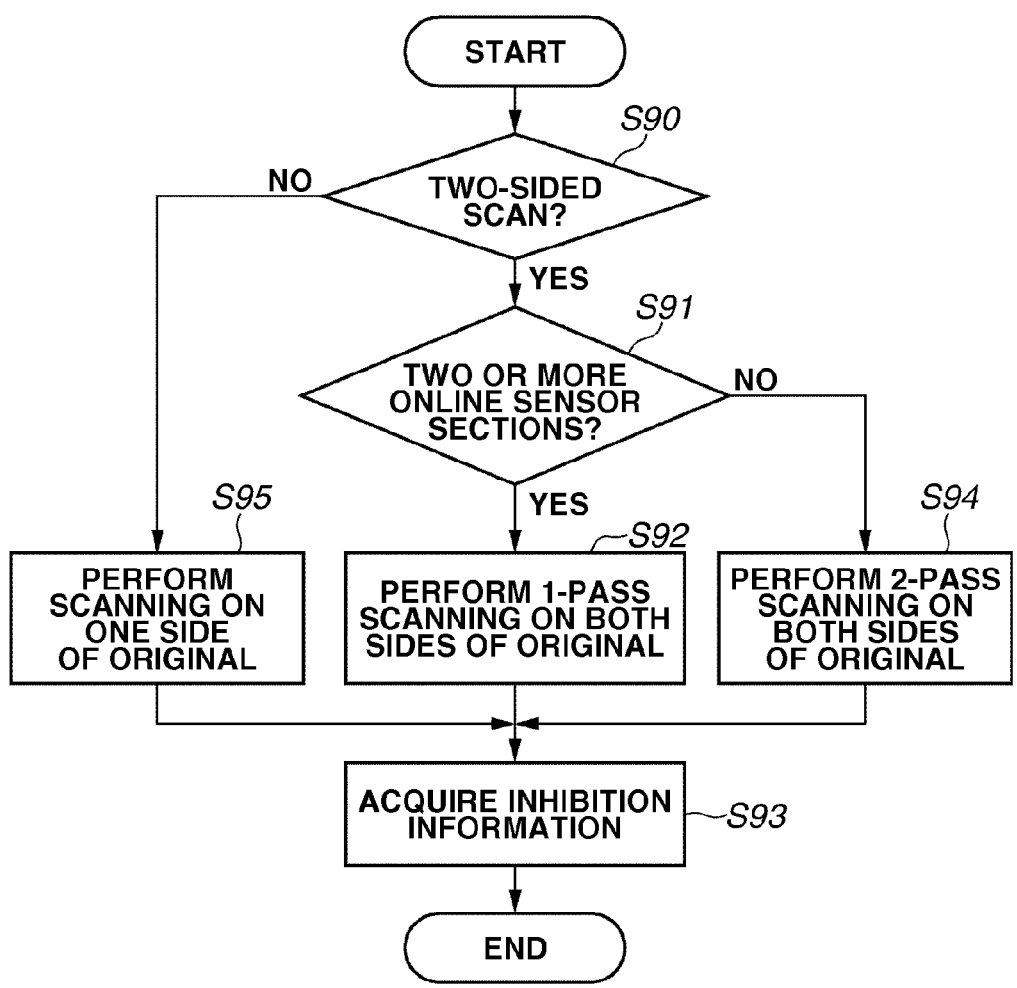
FIG. 25 is a flowchart illustrating example processing for switching a reading function in response to a detection of an acquisition function.

FIG. 25 is a flowchart illustrating example reading method switching processing that can be performed by the MFP 30 in response to a detection of the acquisition function according to the present exemplary embodiment. The MFP 30 starts the processing of the flowchart illustrated in FIG. 25 when a user instructs scanning an original via the operation unit 5.

The processing of the flowchart illustrated in FIG. 25 corresponds to the processing in steps S70 to S72 illustrated in FIG. 7 and the processing in steps S80 to S82 illustrated in FIG. 8. The processing in steps to be executed after acquisition of the inhibition information 2103 is similar to the processing described with reference to FIGS. 7 and 8 and therefore the descriptions for these steps are not repeated.

Further, processing for detecting an information pattern and generating information is similar to the processing in steps S70A and S71 illustrated in FIG. 7 and the processing in steps S80A and S81 illustrated in FIG. 8 and therefore the descriptions for these steps are not repeated.

The flowchart illustrated in FIG. 25 is applicable to an original that includes an information pattern. If no information pattern is included in an original, the control unit executes the processing in step S78 illustrated in FIG. 7 or step S88 illustrated in FIG. 8. Example processing according to the present exemplary embodiment, which corresponds to steps S70 and S72 illustrated in FIG. 7 or steps S80 and S72 illustrated in FIG. 8, is described below.

In step S90, the control unit 1 determines whether the scanning mode set for the MFP 30 is two-sided scanning. If it is determined that the two-sided scanning is set (YES in step S90), the processing proceeds to step S91. If it is determined that the two-sided scanning is not set (NO in step S90), the processing proceeds to step S95.

In step S91, the control unit 1 determines whether two or more online sensor units 4 are present. If it is determined that there are two or more online sensor units 4 (YES in step S91), the processing proceeds to step S92. If it is determined that two or more online sensor units 4 are not present (NO in step S91), the processing proceeds to step S94.

In step S92, the control unit 1 controls the reading units 2A and 2B to perform 1-pass scanning on both surfaces of the original to generate image data of the original. After completing the generation of the image data, the processing proceeds to step S93.

As described above, the present exemplary embodiment uses the 1-pass reading method (i.e., the higher-speed reading method) in a case where two or more online sensor units 4 are available. Therefore, the present exemplary embodiment can read the original at an appropriate speed comparable to the speed of the online sensor unit 4 that acquires the inhibition information 2103.

With the above-described arrangement, in a case where the inhibition information 2103 is acquired from an original processed by two-sided printing, the present exemplary embodiment can realize appropriate original reading processing considering the inhibition information acquisition speed of the online sensor unit 4.

In step S93, the online sensor unit 4 acquires the inhibition information 2103 from the image data generated by scanning. Then, the control unit 1 terminates the processing illustrated in FIG. 25. In the present exemplary embodiment, the acquisition of the inhibition information 2103 is performed using a plurality of online sensor units 4 to acquire the inhibition information 2103 in a case where two or more online sensor units 4 are available.

In a case where only one online sensor unit 4 is provided, the inhibition information 2103 is acquired by the single online sensor unit 4. The speed in acquiring the inhibition information 2103 from image data, if the amount of the image data is constant, becomes faster when the number of available online sensor units 4 increases.

In step S94, the control unit 1 controls the reading unit 2A to perform scanning on both surfaces of the original according to the 2-pass reading method to generate image data of the original. After completing the generation of the image data, the processing proceeds to step S93.

As described above, the present exemplary embodiment uses the 2-pass reading method (i.e., lower-speed reading method) in a case where two or more online sensor units 4 are not available. Therefore, the present exemplary embodiment can prevent the reading speed from becoming excessively faster compared to the processing time used to acquire the inhibition information 2103. In other words, the present exemplary embodiment can eliminate errors that may be caused by a great amount of image data having been pooled.

In step S95, the control unit 1 controls the reading unit 2A to perform scanning on one surface of the original to generate image data of the original. After completing the generation of the image data, the processing proceeds to step S93.

As described above, the present exemplary embodiment can selectively use the 1-pass reading method and the 2-pass reading method according to the inhibition information acquisition function (i.e., considering availability of two or more online sensor units 4). Thus, the present exemplary embodiment can obtain the following effects. The present exemplary embodiment can eliminate errors that may occur due to a great amount of time delay between reading processing of an original and acquisition of the inhibition information 2103.

In the above-described present exemplary embodiment, it is determined whether two or more online sensor units 4 are available to detect the inhibition information acquisition function for the purpose of switching the reading method. However, another configuration may be used.

For example, the control unit 1 compares a processing time (or a processing speed) used for the online sensor unit 4 to acquire the inhibition information 2103 with a predetermined threshold. If the processing time is longer than the threshold, the control unit 1 reads the original using the lower-speed reading method (e.g., 2-pass reading method). On the other hand, if the processing time is equal to or less than the threshold, the control unit 1 uses the higher-speed reading method (e.g., 1-pass reading method). The above-described modified configuration can obtain effects similar to those obtained by the configuration described in the present exemplary embodiment.

In the present exemplary embodiment, the 1-pass reading method and the 2-pass reading method have been described as example reading methods that are different in speed. However, any other type of reading methods can be used if they are different in reading speed.

The above-described analysis operation and display performed by the apparatus can be applied to processing for recording and distributing display contents as information, and similarly to recording of log information or transfer of the information. The above-described analysis operation and display performed by the apparatus can be also applied to any other function using embedded information.

The present invention can be applied to a system including a plurality of devices (e.g., a computer, an interface device, a reader, and a printer), and can be applied to an independent device or apparatus (e.g., a copying machine, a printer, or a facsimile apparatus).

To realize respective steps of the present invention, a personal computer or a processing apparatus (e.g., a central processing unit (CPU) or a processor) can execute a software (or program) that can be acquired via a network or from various storage media (i.e., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application Nos. 2008-200946 filed Aug. 4, 2008, and 2009-041002 filed Feb. 24, 2009, each hereby incorporated by reference herein in their entireties.

What is claimed is:
1. An apparatus comprising:
a reading unit configured to read a print product to obtain image data;
a transmission unit configured to transmit the image data to an external apparatus;

an inhibition unit configured to inhibit transmission of the image data to be performed by the transmission unit based on inhibition information included in the image data; and an acquisition and display unit configured to acquire trace information and inhibition information included in the image data and perform a display based on at least the trace information without causing the transmission unit to transmit the image data to an external apparatus in a case that an information analysis mode is set.

2. The apparatus according to claim 1,
wherein the acquisition and display unit also performs the display based on the trace information and the inhibition information in a case that a suspended state determination mode is set.

3. The apparatus according to claim 1, further comprising:
a user determination unit configured to determine an authority of a user who uses the reading apparatus; and
a changing unit configured to change a settable mode that can be set by the mode setting unit based on a determination result,
wherein the changing unit sets the information analysis mode as the settable mode when the user's authority is an administrative right.

4. The reading apparatus according to claim 3, further comprising:
a print determination unit configured to determine whether the print product is printed; and
a processing target determination unit configured to determine whether the print product is a processing target print product to be displayed based on the trace information,
wherein, when the mode is the information analysis mode, the processing target determination unit determines that the print product is the processing target print product, and
when the mode is the suspended state determination mode, the processing target determination unit determines that the print product is the processing target print product if the print product is printed.

5. The apparatus according to claim 4, wherein the acquisition and display unit performs the display based on the trace information included in the image data of the print product if it is determined that the print product is the processing target print product.

6. A method comprising:
reading a print product to obtain image data;
transmitting the image data to an external apparatus;
inhibiting transmission of the image data based on inhibition information included in the image data; and
acquiring trace information and inhibition information included in the image data and performing a display based on at least the trace information without transmitting the image data to an external apparatus in a case that an information analysis mode is set.

7. The method according to claim 6,
wherein the display based on the trace information and the inhibition information is also performed in a case that a suspended state determination mode is set.

8. The method according to claim 6, further comprising:
determining an authority of a user; and
changing a settable mode based on a determination result of the user's authority,
wherein the information analysis mode is set as the settable mode if it is determined the user's authority is an administrative right.

9. The method according to claim 8, further comprising:
determining whether the print product is printed; and
determining whether the print product is a processing target print product to be displayed based on the trace information,
wherein, when the mode is the information analysis mode, the print product is the processing target print product, and
when the mode is the suspended state determination mode, the print product is the processing target print product if it is determined that the print product is printed.

10. The method according to claim 9, wherein the display based on the trace information included in the image data of the read print product is performed if it is determined that the print product is the processing target print product.

11. A non-transitory computer-readable storage medium storing a program that causes a computer to execute processing according to the method defined in claim 6.

12. The non-transitory computer-readable storage medium according to claim 11,
wherein the display based on the trace information and the inhibition information is also performed in a case that a suspended state determination mode is set.

13. The non-transitory computer-readable storage medium according to claim 11, further comprising:
determining an authority of a user; and
changing a settable mode based on a determination result of the user's authority,
wherein the information analysis mode is set as the settable mode if it is determined the user's authority is an administrative right.

14. The non-transitory computer-readable storage medium according to claim 13, further comprising:
determining whether the print product is printed; and
determining whether the print product is a processing target print product to be displayed based on the trace information,
wherein, when the mode is the information analysis mode, the print product is the processing target print product, and
when the mode is the suspended state determination mode, the print product is the processing target print product if it is determined that the print product is printed.

15. The non-transitory computer-readable storage medium according to claim 14, wherein the display based on the trace information included in the image data of the read print product is performed if it is determined that the print product is the processing target print product.

* * * * *